United States Patent
Reeves et al.

(10) Patent No.: US 7,751,607 B2
(45) Date of Patent: Jul. 6, 2010

(54) SYSTEM, METHOD AND APPARATUS FOR SMALL PULMONARY NODULE COMPUTER AIDED DIAGNOSIS FROM COMPUTED TOMOGRAPHY SCANS

(75) Inventors: Anthony P. Reeves, Ithaca, NY (US); David Yankelevitz, Brooklyn, NY (US); Claudia Henschke, New York, NY (US); Antoni Chan, San Diego, CA (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 12/277,877

(22) Filed: Nov. 25, 2008

(65) Prior Publication Data

US 2009/0080748 A1  Mar. 26, 2009

Related U.S. Application Data

(62) Division of application No. 10/688,267, filed on Oct. 17, 2003, now Pat. No. 7,499,578.

(60) Provisional application No. 60/419,597, filed on Oct. 18, 2002.

(51) Int. Cl.
*G06K 9/00* (2006.01)
(52) U.S. Cl. .................. 382/131; 382/173; 382/128
(58) Field of Classification Search .............. 382/131, 382/154, 128; 600/407
See application file for complete search history.

(56) References Cited

U.S. PATENT DOCUMENTS

| | | | |
|---|---|---|---|
| 5,228,443 A | 7/1993 | Tatar | |
| 5,283,837 A | 2/1994 | Wood | |
| 5,289,374 A | 2/1994 | Doi et al. | |
| 5,351,067 A | 9/1994 | Lumelsky et al. | |
| 5,666,434 A | 9/1997 | Nishikawa et al. | |
| 5,673,332 A * | 9/1997 | Nishikawa et al. | 382/128 |
| 5,712,926 A | 1/1998 | Eberhard et al. | |
| 5,825,936 A | 10/1998 | Clarke et al. | |

(Continued)

OTHER PUBLICATIONS

Author: A. Akanuma; Title: "Clinical method to estimate time of origin and maximum volume of malignant tumors"; *Radiation Medicine*, 1(1):89-104; Date of Publication: Jan.-Mar. 1983; Place of Publication: Japan.

(Continued)

*Primary Examiner*—Daniel G Mariam
*Assistant Examiner*—Aklilu K Woldemariam
(74) *Attorney, Agent, or Firm*—Hoffmann & Baron, LLP

(57) ABSTRACT

The present invention is a multi-stage detection algorithm using a successive nodule candidate refinement approach. The detection algorithm involves four major steps. First, the lung region is segmented from a whole lung CT scan. This is followed by a hypothesis generation stage in which nodule candidate locations are identified from the lung region. In the third stage, nodule candidate sub-images pass through a streaking artifact removal process. The nodule candidates are then successively refined using a sequence of filters of increasing complexity. A first filter uses attachment area information to remove vessels and large vessel bifurcation points from the nodule candidate list. A second filter removes small bifurcation points. The invention also improves the consistency of nodule segmentations. This invention uses rigid-body registration, histogram-matching, and a rule-based adjustment system to remove missegmented voxels between two segmentations of the same nodule at different times.

27 Claims, 20 Drawing Sheets

U.S. PATENT DOCUMENTS

| | | | |
|---|---|---|---|
| 5,877,771 A | | 3/1999 | Drebin et al. |
| 6,141,437 A | * | 10/2000 | Xu et al. .................... 382/130 |
| 6,205,350 B1 | | 3/2001 | Lorenz et al. |
| 6,549,646 B1 | * | 4/2003 | Yeh et al. .................... 382/132 |
| 2002/0006216 A1 | * | 1/2002 | Armato et al. ............... 382/131 |
| 2002/0164061 A1 | * | 11/2002 | Paik et al. .................... 382/131 |
| 2002/0191827 A1 | * | 12/2002 | Armato et al. ............... 382/131 |
| 2003/0086599 A1 | * | 5/2003 | Armato et al. ............... 382/131 |
| 2003/0095696 A1 | * | 5/2003 | Reeves et al. ............... 382/131 |
| 2003/0099387 A1 | * | 5/2003 | Doi et al. .................... 382/131 |
| 2003/0099390 A1 | * | 5/2003 | Zeng et al. .................. 382/131 |

OTHER PUBLICATIONS

Author: E. Arana, P. Delicado, and L. Marti-Bonmati.; Title: "Validation procedures in radiologic diagnostic models"; Neural network and logistic regression. *Investigative Radiology*, 34(10):636-642; Date of Publication: Oct. 1999; Place of Publication: Spain.

Author: S. G. Armato, III, M. L. Giger, K. Ashizawa, and H. MacMahon; Title: "Automated lung segmentation in digital lateral chest radiographs"; *Medical Physics*, 25(8):1507-1520; Date of Publication: Aug. 1998; Place of Publication: U.S.

Author: S. G. Armato, III, M. L. Giger, C. J. Moran, J. T. Blackburn, K. Doi, and H. MacMahon; Title: "Computerized detection of pulmonary nodules on CT scans"; *Radiographics*, 19(5):1303-1311; Date of Publication: Sep.-Oct. 1999; Place of Publication: U.S.

Author: P. J. Besl and R. C. Jain; Title: "Invariant surface characteristics for 3D object recognition in range images"; *Computer Vision, Graphics, and Image Processing*, 33(1):33-80; Date of Publication: Jan. 1986; Place of Publication: U.S.

Author: R. N. Bracewell and S. J. Wernecke; Title: "Image reconstruction over a finite field of view"; *Journal of the Optical Society of America*, 65:1342-1346; Date of Publication: 1975; Place of Publication: U.S.

Author: M. S. Brown, M. F. McNitt-Gray, N. J. Mankovich, J. G. Goldin, J. Hiller, L. S. Wilson, and D. R. Aberle; Title: "Method for segmenting chest CT image data using an anatomical model: Preliminary results"; *IEEE Transactions on Medical Imaging*, 16(6):828-839; Date of Publication: Dec. 1997; Place of Publication: U.S.

Author: M. J. Carreira, D. Cabello, M. G. Penedo, and A. Mosquera; Title: "Computer-aided diagnoses: Automatic detection of lung nodules"; *Medical Physics*, 25(10):1998-2006; Date of Publication: Oct. 1998; Place of Publication: Spain.

Author: G. Cittadini Jr., R. Conzi, and G. Motta; Title: "Spiral computed tomography in the diagnosis and staging of bronchopulmonary carcinoma"; *Chir Ital*, 47(3):13-17; Date of Publication: 1995; Place of Publication: Italy.

Author: J. Collins and E. J. Stern; Title: "Ground-glass opacity at CT: the ABCs"; *AJR American Journal of Roentgenology*, 169(2):355-367; Date of Publication: Aug. 1997; Place of Publication: U.S.

Author: V. P. Collins, R. K. Loeffler, and H. Tivey; Title: "Observations on growth rates of human tumors"; *American Journal of Roentgenology*, 76:988-1000; Date of Publication: 1956; Place of Publication: U.S.

Author: ACR-NEMA Standards Committee. *Digital Imaging and Communications in Medicine (DICOM): Version 3.2*. Rosslyn, VA; Date of Publication: 1999; Place of Publication: U.S.

Author: A. M. Cormack.; Title: "Representation of a function by its line integrals with some radiological applications"; *Journal of Applied Physics*, 34:2722-2727; Date of Publication: 1963; Place of Publication: U.S.

Author: A. M. Cormack.; Title: "Representation of a function by its line integrals with some radiological applications II"; *Journal of Applied Physics*, 34:2908-2913; Date of Publication: 1964; Place of Publication: U.S.

Author: P. Croisille, M. Souto, M. Cova, S. Wood, Y. Afework, J. E. Kuhlman, and E. A. Zerhouni; Title: "Pulmonary nodules: Improved detection with vascular segmentation and extraction with spiral CT"; Work in progress. *Radiology*, 197(2):397-401; Date of Publication: Nov. 1995; Place of Publication: U.S.

Author: S. Dholakia and D. C. Rappaport; Title: "The solitary pulmonary nodule. Is it malignant or benign?"; *Postgraduate Medicine*, 99(2):246-250; Date of Publication: Feb. 1996; Place of Publication: U.S.

Author: C. E. Engeler, J. H. Tashjian, S. W. Trenkner, and J. W. Walsh; Title: "Ground-glass opacity of the lung parenchyma: a guide to analysis with high-resolution CT"; *AJR American Journal of Roentgenology*, 160(2):249-251; Date of Publication: Feb. 1993; Place of Publication: U.S.

Author: B. J. Flehinger. M. Kimmel, T. Polyak, and M. R. Melamed; Title: "Screening for lung cancer"; the Mayo Lung Project revisited. *Cancer*, 72(5):1573-1580; Date of Publication: Sep. 1 1993; Place of Publication: U.S.

Author: R. S. Fontana, D. R. Sanderson, L. B. Woolner, W. F. Taylor, W. E. Miller, J. R. Muhm, P. E. Bernatz, W. S. Payne, P. C. Pairolero, and E. J. Bergstralh; Title: "Screening for lung cancer"; A critique of the Mayo Lung Project. *Cancer*, 67(4 (suppl.)):1155-1164; Date of Publication: Feb. 15, 1991; Place of Publication: U.S.

Author: A. Van Gelder and J. Wilhelms; Title: "Topological considerations in isosurface generation"; *ACM Transactions on Graphics*, 13(4):337-375; Date of Publication: Oct. 1994; Place of Publication: U.S.

Author: M. L. Giger, K. T. Bae, and H. MacMahon; Title: "Computerized detection of pulmonary nodules in computed tomography images"; *Investigative Radiology*, 29(4):459-465; Date of Publication: Apr. 1994; Place of Publication: U.S.

Author: M. L. Giger, K. Doi, and H. MacMahon; Title: "Image feature analysis and computer-aided diagnosis in digital radiography. 3. Automated detection of nodules in peripheral lung fields"; *Medical Physics*, 15(2):158-166; Date of Publication: Mar.-Apr. 1988; Place of Publication: U.S.

Author: R. C. Gonzales and R. E. Woods; *Digital Image Processing*. Addison-Wesley, Reading, MA; Date of Publication: 1992; Place of Publication: U.S.

Author: J. W. Green and C. C. Lushbaugh; Title: "Histopathological study of the mode of inhibition of cellular proliferation by urethane"; *Cancer Research*, 9:199-209; Date of Publication: 1949; Place of Publication: U.S.

Author: Gurney, Jud W.; Title: "Determining the likelihood of malignancy in solitary pulmonary nodules with Bayesian analysis"; Part 1. Theory. *Radiology*, 186(2):405-413; Date of Publication: Feb. 1993; Place of Publication: U.S.

Author: J. A. Hanley and B. J. McNeil; Title: "The meaning and use of the area under a receiver operating characteristic (ROC) curve"; *Radiology*, 143(1):29-36; Date of Publication: Apr. 1982; Place of Publication: Canada.

Author: C.I. Henschke, D.I. McCauley, D.F. Yankelevitz, D. P. Naidich, G. McGuinness, O. S. Miettinen, D. M. Libby, M. W. Pasmantier, J. Koizumi, N. K. Altorki, and J. P. Smith; Title: "Early Lung Cancer Action Project: overall design and findings from baseline screening;" *Lancet*, 354(9173):99-105; Date of Publication: Jul. 1999; Place of Publication: U.S.

Author: C. J. Herold, A. A. Bankier, and D. Fleischmann; Title: "Lung metastases"; *European Radiology*, 6(5):596-606; Date of Publication: 1996; Place of Publication: Austria.

Author: G. N. Hounsfield; Title: "Computerized transverse axial scanning (tomography). I. Description of system"; *British Journal of Radiology*, 46(552):1016-1022; Date of Publication: Dec. 1973; Place of Publication: England.

Author: G. N. Hounsfield; Title: "Computed medical imaging"; Nobel lecture, Dec. 8, 1979. *Journal of Computer Assisted Tomography*, 4(5):665-674; Date of Publication: Oct. 1980; Place of Publication: England.

Author: Z. Huo, M. L. Giger, C. J. Vyborny, U. Bick, P. Lu, D. E. Wolverton, and R. A. Schmidt; Title: "Analysis of spiculation in the computerized classification of mammographic masses"; *Medical Physics*, 22(10):1569-1579; Date of Publication: Oct. 1995; Place of Publication: U.S.

Author: Z. Huo, M. L. Giger, C. J. Vyborny, D. E. Wolverton, R. A. Schmidt, and K. Doi; Title: "Automated computerized classification of malignant and benign masses on digitized mammograms"; *Academic Radiology*, 5(3):155-168; Date of Publication: Mar. 1998; Place of Publication: U.S.

Author: S. Itoh, M. Ikeda, T. Isomura, T. Endo, K. Yamakawa, K. Itoh, S. Naganawa, K. Maruyama, and T. Ishigaki; Title: "Screening helical CT for mass screening of lung cancer: application of low-dose and single-breath-hold scanning"; *Radiation Medicine*, 16(2):75-83; Date of Publication: Mar.-Apr. 1998; Place of Publication: Japan.

Author: R. Jain, R. Kasturi, and B. G. Schunck. *Machine Vision*. McGraw-Hill, New York; Date of Publication: 1995; Place of Publication: U.S.

Author: L. R. Kaiser and J. B. Shrager; Title: "Video-assisted thoracic surgery: the current state of the art"; *AJR American Journal of Roentgenology*, 99(2):246-250; Date of Publication: Feb. 1996; Place of Publication: U.S.

Author: W. A. Kalender; Title: "Technical foundations of spiral CT"; *Seminars in Ultrasound, CT, and MRI*, 15(2):81-89; Date of Publication: Apr. 1994; Place of Publication: Germany.

Author: W. A. Kalender; "Thin-section three-dimensional spiral CT: is isotropic imaging possible?"; *Radiology*, 197(3):578-580; Date of Publication: Dec. 1995; Place of Publication: Germany.

Author: W. A. Kalender, W. A. Seissle, E. Klotz, and P. Vock; Title: "Spiral volumetric CT with single breath-hold technique continuous transport and continuous scanner rotation"; *Radiology*, 176(1):181-183; Date of Publication: Jul. 1990; Place of Publication:Switzerland.

Author: M. Kaneko, K. Eguchi, H. Ohmatsu, R. Kakinuma, T. Naruke, K. Suemasu, and N. Moriyama; Title: "Peripheral lung cancer: screening and detection with low-dose spiral CT versus radiography"; *Radiology*, 201(3):798-802; Date of Publication: Dec. 1996; Place of Publication: Japan.

Author: Y. Kawata, N. Niki, H. Ohmatsu, K. Eguchi, and N. Moriyama; Title: "Shape analysis of pulmonary nodules based on thin section CT images"; SPIE *Proceedings*, 3034:964-974; Date of Publication: Feb. 1997; Place of Publication: Japan.

Author: J. H. Kim, J. G. Im, M. C. Han, B. G. Min, and C. W. Lee; Title: "Improved visualization of simulated nodules by adaptive enhancement of digital chest radiography"; *Academic Radiology*, 1(2):93-99; Date of Publication: Oct. 1994; Place of Publication: South Korea.

Author: T. Kobayashi, X.-W. Xu, H. MacMahon, C. E. Metz, and K. Doi; Title: "Effect of a computer-aided diagnosis scheme on radiologists' performance in detection of lung nodules on radiographs"; *Radiology*, Date of Publication: Jun. 1996; Place of Publication: U.S.

Author: A. K. Laird; Title: "Dynamics of tumor growth: Comparison of growth rates and extrapolation of growth curve to one cell"; *British Journal of Cancer*, 19:278-291; Date of Publication: 1965; Place of Publication: U.S.

Author: S. H. Landis, T. Murray, S. Bolden, and P. A. Wingo; Title: "Cancer statistics, 1999";. *CA: A Cancer Journal for Clinicians*, 49(1):8-31; Date of Publication: Jan.-Feb. 1999; Place of Publication: U.S.

Author: G. A. Lillington; Title: "Management of solitary pulmonary nodules"; *Postgraduate Medicine*, 101(3):145-150; Date of Publication: Mar. 1997; Place of Publication: U.S.

Author: W. E. Lorensen and H. E. Cline; Title: "Marching cubes: A high resolution 3D surface construction algorithm"; *Computer Graphics*, 21(4):163-169; Date of Publication: Jul. 1987; Place of Publication: U.S.

Author: F. Mao, W. Qian, J. Gaviria, and L. P. Clarke; Title: "Fragmentary window filtering for multiscale lung nodule detection: Preliminary study"; *Academic Radiology*, 5(4):306-311; Date of Publication: Apr. 1998; Place of Publication: U.S.

Author: T. Matsumoto, H. Yoshimura, K. Doi, M. L. Giger, A. Kano, H. MacMahon, K. Abe, and S. M. Montner; Title: "Image feature analysis of false-positive diagnoses produced by automated detection of lung nodules"; *Investigative Radiology*, 27(8):587-597; Date of Publication: Aug. 1992; Place of Publication: U.S.

Author: M. F. McNitt-Gray, E. M. Hart, N. Wyckoff, J. W. Sayre, J. G. Goldin, and D. R. Aberle; Title: "A pattern classification approach to characterizing solitary pulmonary nodules imaged on high resolution CT: Preliminary results"; *Medical Physics*, 26(6):880-888; Date of Publication: Jun. 1999; Place of Publication: U.S.

Author: M.R. Melamed, B. J. Flehinger, M. B. Zaman, R. T. Heelan, W. A. Perchick, and N. Martini; Title: "Screening for early lung cancer. Results of the Memorial Sloan-Kettering study in New York"; *Chest*, 86(1):44-53; Date of Publication: Jul. 1984; Place of Publication: U.S.

Author: S. Mitruka, R. J. Landreneau, M. J. Mack, L. S. Fetterman, J. Gammie, S. Bartley, S. R. Sutherland, C. M. Bowers, R. J. Keenan RJ, P. F. Ferson, and R. J. Weyant; Title: "Diagnosing the indeterminate pulmonary nodule: percutaneous biopsy versus thoracoscopy"; *Surgery*, 118(4):676-684; Date of Publication: Oct. 1995; Place of Publication: U.S.

Author: O. Monga, R. Deriche, and J.-M. Rocchisani; Title: "3D edge detection using recursive filtering: Application to scanner images"; *Computer Vision, Graphics, and Image Processing: Image Understanding*, 53(1):76-87; Date of Publication: Jan. 1991; Place of Publication: France.

Author: H. Nathan; Title: "Management of solitary pulmonary nodules. An organized approach based on growth rate and statistics"; *JAMA*, 227(10):1141-1144; Date of Publication: Mar. 1974; Place of Publication: U.S.

Author: M. H. Nathan, V. P. Collins, and R. A. Adams; Title: "Differentiation of benign and malignant pulmonary nodules by growth rate"; *Radiology*, 79:221-231; Date of Publication: 1962; Place of Publication: U.S.

Author: R. Pearl and L. J. Reed; Title: "On the rate of growth of the population of the United States since 1790 and its mathematical presentation"; *Proceedings of the National Academy of Sciences*, 6:275-285; Date of Publication: 1920; Place of Publication: U.S.

Author: J. Peiss, M. Verlande, W. Ameling, and R. W. Guenther; Title: "Classification of lung tumors on chest radiographs by fractal texture analysis"; *Investigative Radiology*, 31(10):625-629; Date of Publication: Oct. 1996; Place of Publication: Germany.

Author: M. G. Penedo, M. J. Carreira, A. Mosquera, and D. Cabello; Title: "Computer-aided diagnosis: A neural-network-based approach to lung nodule detection"; *IEEE Transactions on Medical Imaging*, 17(6):872-880; Date of Publication: Dec. 1998; Place of Publication: Spain.

Author: R. J. Prokop and A. P. Reeves; Title: "A survey of moment-based techniques for unoccluded object representation and recognition"; *CVGIP: Graphical Models and Image Processing*, 54(5):438-360; Date of Publication: Sep. 1992; Place of Publication: U.S.

Author: R. D. Pugatch; Title: "Radiologic evaluation in chest malignancies. A review of imaging modalities"; *Chest*, 107(6 (suppl.)):294S-297S; Date Publication: Jun. 1995; Place of Publication: U.S.

Author: A. P. Reeves, W. J. Kostis, C. 1. Henschke, B. Zhao, and D. F. Yankelevitz; Title: "Three-dimensional feature characterization of small pulmonary nodules from helical CT images"; *Radiology*, 209P:163; Date of Publication: Nov. 1998; Place of Publication: U.S.

Author: A. P. Reeves, W. J. Kostis, D. F. Yankelevitz, and C. I. Henschke; Title: "Three-dimensional shape characterization of solitary pulmonary nodules from helical CT scans"; in H. U. Lemke, M. W. Vannier, K. Inamura, and A. G. Farman, editors, *Proceedings of Computer Assisted Radiology and Surgery (CARS '99)*, pp. 83-87. Elsevier Science; Date of Publication: Jun. 1999; Place of Publication: U.S.

Author: A. P. Reeves, R. J. Prokop, S. E. Andrews, and F. P. Kuhl; Title: "Three-dimensional shape analysis using moments and Fourier descriptors"; *IEEE Transactions on Pattern Analysis and Machine Intelligence*, 10(6):937-943; Date of Publication: Nov. 1988; Place of Publication: U.S.

Author: A. P. Reeves and B. S. Wittner; Title: "Shape analysis of three dimensional objects using the method of moments"; In *Proceedings of 1983 IEEE Conference on Computer Vision and Patten Recognition*, pp. 20-26; Date of Publication: Jun. 1983; Place of Publication: U.S.

Author: J. Remy, M. Remy-Jardin, F. Giraud, and J. Wannebroucq; Title: "Spiral volumetric scanning and its applications in thoracic pathology"; *Rev Mal Respir*, 11(1):13-27; Date of Publication: 1994; Place of Publication: France.

Author: T. W. Ridler and S. Calvard; Title: "Picture thresholding using an iterative selection method"; *IEEE Transactions on Systems, Man, and Cybernetics*, SMC-8(8):630-632; Date of Publication: Aug. 1978; Place of Publication: London.

Author: K. V. Rolston, S. Rodriguez, M. Dholakia, E. Whimbey E, and I. Raad; Title: "Pulmonary infections mimicking cancer: a retrospective; three-year review"; *Support Care Cancer*, 5(2):90-93; Date of Publication: Mar. 1997; Place of Publication: U.S.

Author: S. Sanada, K. Doi, and H. MacMahon; Title: "Image feature analysis and computer-aided diagnosis in digital radiography: automated delineation of posterior ribs in chest images"; *Medical Physics*, 18(5):964-971; Date of Publication: Sep.-Oct. 1991; Place of Publication: U.S.

Author: S. Sasaoka. H. Takabatake, M. Mori, H. Natori, and S. Abe; Title: "Digital analysis of pulmonary nodules-potential usefulness of computer-aided diagnosis for differentiation of benign from malignant nodules"; *Nippon Kyobu Shikkan Gakkai Zasshi*, 33(5):489-496; (With English Abstract) Date of Publication: May 1995; Place of Publication: japan.

Author: M. D. Seemann, A. Staebler, T. Beinert, H. Dienemann, B. Obst, M. Matzko, C. Pistitsch, and M. F. Reiser; Title: "Usefulness of morphological characteristics for the differentiation of benign from malignant solitary pulmonary lesions using HRCT;" *European Radiology*, 9(3):409-417; Date of Publication: 1999; Place of Publication: Germany.

Author: R. Shah, S. Sabanathan, J. Richardson, A. J. Mearns, and C. Goulden; Title "Results of surgical treatment of stage I and II lung cancer"; *Journal of Cardiovascular Surgery*, 37(2):169-172; Date of Publication: Apr. 1996; Place of Publication: United Kingdom.

Author: R. H. Sherrier, C. Chiles, W. E. Wilkinson, G. A. Johnson, and C. E. Ravin; Title: "Effects of image processing on nodule detection rates in digitized chest radiographs: ROC study of observer performance"; *Radiology*, 166(2):447-450; Date of Publication: Feb. 1998; Place of Publication: U.S.

Author: S. Sone, S. Takashima, F. Li, Z. Yang, T. Honda, Y. Maruyama, M. Hasegawa, T. Yamanda, K. Kubo, K. Hanamura, and K. Asakura; Title: "Mass screening for lung cancer with mobile spiral computed tomography scanner"; *Lancet*, 351(9111):1242-1245; Date of Publication: Apr. 1998; Place of Publication: Japan.

Author: M. Sonka, G. Sundararmoorthy, and E. A. Hoffman; Title: "Knowledge-based segmentation of intrathoracic airways from multidimensional high resolution CT images";. *SPIE*, 2168:73-85; Date of Publication: Aug. 1994; Place of Publication: U.S.

Author: J. S. Spratt, J. S. Meyer, and J. A. Spratt; Title: "Rates of growth of human solid neoplasms: Part I"; *Journal of Surgical Oncology*, 60(2):137-146; Date of Publication: Oct. 1995; Place of Publication: U.S.

Author: S. J. Swensen, J. R. Jett, W. S. Payne, R. W. Viggiano, P. C. Pairolero, and V. F. Trastek; Title: "An integrated approach to evaluation of the solitary pulmonary nodule"; *Mayo Clinic Proceedings*, 65(2):173-186; Date of Publication: Feb. 1990; Place of Publication: U.S.

Author: S. J. Swensen, M. D. Silverstein, D. M. Ilstrup, C. D. Schleck, and E. S. Edell; Title: "The probability of malignancy in solitary pulmonary nodules. Application to small radiologically indeterminate nodules"; *Archives of Internal Medicine*, 157(8):849-855; Date of Publication: Apr. 1997; Place of Publication: U.S.

Author: S. Toshioka, K. Kanazawa, N. Niki, H. Satoh, H. Ohmatsu, K. Eguchi, and N. Moriyama; Title: "Computer aided diagnosis system for lung cancer based on helical CT images"; *SPIE Proceedings*, 3034:975-984; Date of Publication: Feb. 1997; Place of Publication: Japan.

Author: J. D. Urschel; Title: "Surgical treatment of peripheral small cell lung cancer"; *Chest Surg Clin N Am*, 7(1):95-103; Date of Publication: Feb. 1997; Place of Publication: U.S.

Author: K. Usuda, Y. Saito, M. Sagawa, M. Sato, K. Kanma, S. Takahashi, C. Endo, Y. Chen, A. Sakurada, and S. Fujimura; Title: "Tumor doubling time and prognostic assessment of patients with primary lung cancer"; *Cancer*, 74(8):2239-2244; Date of Publication: Oct. 1994; Place of Publication: Japan.

Author: N. F. Vittitoe, J. A. Baker, and C. E. Floyd; Title: "Fractal texture analysis in computer-aided diagnosis of solitary pulmonary nodules"; *Academic Radiology*, 4(2):96-101; Date of Publication: Feb. 1997; Place of Publication: U.S.

Author: P. Vock, M. Soucek, M. Daepp, and W. A. Kalender; Title: "Lung: spiral volumetric CT with single-breath-hold technique"; *Radiology*, 176(3):864-867; Date of Publication: Sep. 1990; Place of Publication: Switzerland.

Author: W. Weiss; Title: "Implications of tumor growth rate for the natural history of lung cancer"; *Journal of Occupational Medicine*, 26(5):345-352; Date of Publication: May 1984; Place of Publication: U.S.

Author: S. A. Wood, E. A. Zerhouni, J. D. Hoford, E. A. Hoffman, and W. Mitzner; Title: "Measurement of three-dimensional lung tree structures by using computed tomography"; *Journal of Applied Physiology*, 79(5):1687-97; Date of Publication: Nov. 1995; Place of Publication: U.S.

Author: X.-W. Xu and K. Doi; Title: "Image feature analysis for computer-aided diagnosis: Accurate determination of ribcage boundary in chest radiographs"; *Medical Physics*, 22(5):617-626; Date of Publication: May 1995; Place of Publication: U.S.

Author: X.-W. Xu and K. Doi; Title: Image feature analysis for computer-aided diagnosis: Detection of right and left hemidiaphragm edges and delineation of lung field in chest radiographs; *Medical Physics*, 23(9):1613-1624; Date of Publication: Sep. 1996; Place of Publication: U.S.

Author: X.-W. Xu, K. Doi, T. Kobayashi, H. MacMahon, and M. L. Giger; Title: "Development of an improved CAD scheme for automated detection of lung nodules in digital chest images"; *Medical Physics*, 24(9):1395-1403; Date of Publication: Sep. 1997; Place of Publication: U.S.

Author: S. Yamamoto, I. Tanaka, M. Senda, Y. Tateno, T. Iinuma, T. Matsumoto, and M. Matsumoto; Title: "Image processing for computer-aided diagnosis of lung cancer by CT (LSCT)"; *Systems and Computers in Japan*, 25(2):67-80; Date of Publication: Feb. 1994; Place of Publication: Japan.

Author:D. F. Yankelevitz, C. I. Henschke, J. H. Koizumi, N. K. Altorki, and D. Libby; Title: "CT-guided transthoracic needle biopsy of small solitary pulmonary nodules"; *Clinical Imaging*, 21(2):107-10; Date of Publication: Mar.-Apr. 1997; Place of Publication: U.S.

Author: H. Yoshimura, M. L. Giger, K. Doi, H. MacMahon, and S. M. Montner; Title: "Computerized scheme for the detection of pulmonary nodules: a nonlinear filtering technique"; *Investigative Radiology*, 27(2):124-129; Date of Publication: Feb. 1992; Place of Publication: U.S.

Author: P. Chandrasekhar, L. Wolff, E. Zerhouni, and W. Mitzner; Title: "Segmentation of 3 pulmonary trees using mathematical morphology"; in P. Maragos, R. W. Schafer, and M. A. Butt, editors, *Mathematical Morphology and its Applications to Image and Signal Processing*, pp. 409-416. Kluwer Academic Press; Date of Publication: May 1996; Place of Publication: U.S.

Author: T. Fleiter, E.M. Merkle, A.J. Aschoff, G. Lang, M. Stein, J. Gorich, F. Liewald, N. Rilinger, and R. Sokiranski; Title: "Comparison of real-time virtual and fiberoptic bronchoscopy in patients with bronchial carcinoma: opportunities and limitations"; *American Journal of Roentgenology*, 169(2):1591-1595; Date of Publication: Dec. 1997; Place of Publication: Germany.

Author: M. L. Giger, K.T. Bae, and H. MacMahon; Title: "Image processing and computer-aided diagnosis"; *Radiologic Clinics of North America*, 34(3):565-596; Date of Publication: May 1996; Place of Publication: U.S.

Author: P. A. Heng, P. F. Fung, T. T. Wong, Y. H. Siu, and H. Sun; Title: "Interactive navigation and bronchial tube tracking in virtual bronchoscopy"; *Studies in Health Technology and Informatics*, 62:130-133; Date of Publication: 1999; Place of Publication: Hong Kong.

Author: W. J. Kostis, A. P. Reeves, D. F. Yankelvitz, and C. I. Henschke; Title: "Three-dimensional segmentation of solitary pulmonary nodules from helical CT scans"; in H. U. Lemke, M. W. Vannier, K. Inamura, and A. G. Farman, editors, *Proceedings of Computer Assisted Radiology and Surgery (CARS '99)*, pp. 203-207. Elsevier Science; Date of Publication: Jun. 1999; Place of Publication: U.S.

Author: F. Maes, A. Collingnon, D. Vandermeulen, G. Marchal, and P. Suetens. Title: "Multimodality image registration by maximization of mutual information"; *IEEE Transactions on Medical Imaging*, 16(2):187-198; Date of Publication: Apr. 1997; Place of Publication: Belgium.

Author: W. Park, E. A. Hoffman, and M. Sonka; Title: "Segmentation of intrathoracic airway trees: A fuzzy logic approach"; *IEEE Transactions on Medical Imaging*, 17(4):489-497; Date of Publication: Aug. 1998; Place of Publication: U.S.

Author: A. P. Reeves and W. J. Kostis; Title: "Computer-aided diagnosis for lung cancer"; *Radiologic Clinics of North America*, 38(3):497-509; Date of Publication: May 2000; Place of Publication: U.S.

Author: R. M. Summers, D. H. Feng, S. M. Holland, M. C. Sneller, and J. H. Shelhamer; Title: "Virtual bronchoscopy: Segmentation method for real-time display"; *Radiology*, 200(3):857-862; Date of Publication: Sep. 1996; Place of Publication: U.S.

Author: J. K. Udupa; Title: "Three-dimensional visualization and analysis methodologies: a current perspective"; *Radiographics*, 19(3):783-806; Date of Publication: May-Jun. 1999; Place of Publication: U.S.

Author: W. M. Wells, III, P. Viola, H. Atsumi, S. Nakajima, and R. Kikinis; Title: "Multi-modal volume registration by maximization of mutual information"; *Medical Image Analysis*, 1(1):35-51; Date of Publication: Mar. 1996; Place of Publication: U.S.

Author: D. F. Yankelevitz, R. Gupta, B. Zhao, and C. I. Henschke;. Title: "Small pulmonary nodules: Evaluation with repeat CT-preliminary experience"; *Radiology*, 212(2):561-566; Date of Publication: Aug. 1999; Place of Publication: U.S.

Author: D. F. Yankelevitz, A. P. Reeves, W. J. Kostis, B. Zhao, and C. I. Henschke; Title: "Determination of malignancy in small pulmonary nodules based on volumetrically determined growth rates"; *Radiology*, 209P:375; Date of Publication: Nov. 1998; Place of Publication: U.S.

Author: D. F. Yankelevitz, A. P. Reeves, W. J. Kostis, B. Zhao, and C. I. Henschke; Title: "Small Pulmonary Nodules: Volumetrically Determined Growth Rates Based on CT Evaluation"; Radiology, 217(1):251-256; Date of Publication: Oct. 2000; Place of Publication: U.S.

Author: A. P. Reeves and W. J. Kostis; Title: "Computer-Aided Diagnosis of Small Pulmonary Nodules"; *Seminars in Ultrasound, CT, and MRI*, 21(2):116-128; Date of Publication: Apr. 2000; Place of Publication: U.S.

Author: B. Zhao, W. J. Kostis, A. P. Reeves, D. F. Yankelevitz, and C. I. Henschke; Title: "Consistent Segmentation of Repeat CT Scans for Growth Assessment in Pulmonary Nodules"; Proceedings of the SPIE, Medical Imaging 1999, 3661:1012-1018; Date of Publication: May 1999; Place of Publication: U.S.

Author: S. Hu, E. A. Hoffman, and J.M. Reinhardt; Title: "Automatic Lung Segmentation for Accurate Quantitation of Volumetric X-Ray CT Images"; *IEEE Transactions on Medical Imaging*, vol. 20, No. 6; Date of Publication: Jun. 2001; Place of Publication: U.S.

Author: J. Hsieh; Title: "Generalized Adaptive Median Filters and their in Computed Tomography"; *SPIE*, vol. 2298, pp. 662-669; Date of Publication: 1994; Place of Publication: U.S.

Author: J. Hsieh; Title: "Adaptive Trimmed Mean Filter for CT Imaging"; Mathematical Methods in Medical Imaging III, Proceedings of *SPIE*, vol. 2299, pp. 316-324; Date of Publication: 1994; Place of Publication: U.S.

Author: H. Soltanian-Zadeh, J.P. Windham and J. Soltanianzadeh; Title: "CT Artifact Correction: An Image Processing Approach"; Medical Imaging 1996: Image Processing, Proceedings of *SPIE*, vol. 2710, pp. 477-485; Date of Publication:1996; Place of Publication: U.S.

Author: A. P. Reeves, W. J. Kostis, D. F. Yankelevitz, C.I. Henschke; Title: "Analysis of Small Pulmonary Nodules without Explicit Segmentation of CT images"; *Radiological Society of North America—2000 Scientific Program*, vol. 217, pp. 243-244; Date of Publication: Nov. 2000; Place of Publication: U.S.

Author: Y. Lee, T., Hara, H. Fujita, S. Itoh, and T. Ishigaki; Title: "Automatic Detection of Pulmonary Nodules in Helical CT Images Based on an Improved Template-Matching Technique"; *IEEE Transactions on Medical Imaging*, vol. 20, No. 7, pp. 595-604; Date of Publication: Jul. 2001; Place of Publication: U.S.

Author: F. Maes, A. Collignon, D. Vandermeulen, G. Marchal and P. Suetens; Title: "Multimodality image registration by maximization of mutual information"; *IEEE Transactions on Medical Imaging*, vol. 16, No. 2, pp. 187-198; Date of Publication: Apr. 1997; Place of Publication: U.S.

Author: Takagi, N.; Kawata, Y., Nikvi, N.; Morit, K.; Ohmatsu, H.; Kakinuma, R.; Eguchi, K.; Kusumoto, M.; Kaneko, M.; Moriyama, N.; Title: "Computerized characterization of contrast enhancement patterns for classifying pulmonary nodules"; *Image Processing, 2000. Proceedings. 2000 International Conference* on vol. 1, pp. 188-191; Date of Publication: 2000; Place of Publication: U.S.

Author: A. P. Reeves, W. J. Kostis; Title: "Computer-Aided Diagnosis of Small Pulmonary Nodules"; *Seminars in Ultrasound, CT. and MRI*, vol. 21, No. 2, pp. 116-128; Date of Publication: Apr. 2000; Place of Publication: U.S.

Author: W. J. Kostis, A. P. Reeves, D. F. Yankelevitz, C.I. Henschke; Title: "Three-dimensional segmentation of solitary pulmonary nodules from helical CT scans"; *CARS '99 Computer Assisted Radiology and Surgery: Proceedings of the 13$^{th}$ International Congress and Exhibition*, pp. 203-207; Date of Publication: 1999; Place of Publication: U.S.

Author: Li Fan, Carol L. Novak, Jiangzhong Qian, Gerhard Kohl, and David P. Naidich; Title: "Automatic Detection of Lung Nodules from Multi-Slice Low Dose CT Images"; Proc SPIE 2001; 4322:1828-1835; Date of Publication: 2001; Place of Publication: U.S.

Author: Binsheng Zhao, Anthony Reeves, David Yankelevitz, and Claudia Henschke; Title: "Three-Dimensional multi-criterion automatic segmentation of pulmonary nodules of helical CT images"; Optical Engineering, 38(8):1340-1347; Date of Publication: 1999; Place of Publication: U.S.

Author: American Cancer Society; Title: "Cancer Facts & Figures 2002"; 1599 Clifton Road, NE, Atlanta, GA, 30329-4251.

Author: Claudia I. Henschke, D.P. Naidich, D.F. Yankelevitz, G. McGuinness, D.I. McCauley, J.P. Smith, D.M. Libby, M.W. Pasmantier, M. Vazquez, J. Koizumi, D. Flleder, N.K. Altorki, and O.S. Miettinen; Title: "Early Lung Cancer Action Project: Initial Findings on Repeat Screening"; Cancer Jul. 1, 2001; 92(1):153-159; Date of Publication: Jul. 1, 2001; Place of Publication.

Author: S.G. Armato III, M.L. Giger, J.T. Blackburn, K. Doi, H. MacMahon; Title: "Three-dimensional approach to lung nodule detection in helical CT"; *SPIE*, vol. 3661, pp. 553-559; Date of Publication: 1999; Place of Publication: U.S.

Author: S.L. Lou, C.L. Chang, K.P. Lin and T. Chen; Title: "Object based deformation technique for 3-D CT lung nodule detection"; *SPIE*, vol. 3661, pp. 1544-1552; Date of Publication: 1999; Place of Publication: U.S.

Author: T. Okumura, T. Miwa, Jun-ichi Kako, S. Yamamoto, M. Matsumoto, Y. Tateno, T. Linua and T. Matsumoto; Title: "Image processing for computer-aided diagnosis of lung cancer screening system by CT (LSCT)"; *SPIE*, vol. 3338, pp. 1314-1322; Date of Publication: 1998; Place of Publication: U.S.

Author: M. Fiebich, C. Wietholt, B.C. Render, S.G. Armato, K.R. Hoffmann, D. Wormanns and S. Diederich; Title: "Automatic detection of pulmonary nodules in low-dose screening thoracic CT examinations"; *SPIE*, vol. 3661, pp. 1434-1439; Date of Publication: 1999; Place of Publication: U.S.

Author: H. Taguchi, Y. Kawata and N. Niki, H. Satoh, H. Ohmatsu, K. Eguchi, M. Kaneko and N. Moriyama; Title: "Lung cancer detection based on helical CT images using curved surface morphology analysis"; *SPIE*, vol. 3661, pp. 1307-1313; Date of Publication: 1999; Place of Publication: U.S.

Author: S-C B. Lo, S-L A. Lou, J-S Lin, M.T. Freedman, M.V. Chien and S.K. Mun; Title: "Artificial convolution neural Network techniques and applications for lung nodule detection"; *IEEE transactions on medical imaging*, vol. 14, No. 4, pp. 711-718; Date of Publication: 1995; Place of Publication: U.S.

Author: W.J. Kostis; Title: "Three-dimensional computed tomographic image analysis for early cancer diagnosis in small pulmonary nodules"; Ph.D. dissertation, Cornell University; Date of Publication: 2001; Place of Publication: U.S.

Author: R. Kakinuma, H. Ohmatsu, M. Kaneko, K. Eguchi, K. Naruke, K. Nagai; Title: "Detection failures in spiral CT screening for lung cancer: analysis of CT findings"; Radiology, 212, pp. 61-66; Date of Publication: 1999; Place of Publication: U.S.

Author: F. Li, S. Sone, H. Abe, H.M. MacMahon, S.G. Armato, K. Doi; Title: "Missed Lung Cancers in low-dose Helical CT Screening Obtained from a General Population"; scientific paper presentation, RSNA 87$^{th}$ scientific assembly and annual meeting, Nov. 25-30, 2001.

Author: M. Remy Jardin, F. Giraud, C-H Marquette; Title: "Pulmonary nodules: detection with thick section spiral CT versus conventional CT"; Radiology, 187(No. 2), pp. 513-520; Date of Publication: 1993; Place of Publication: U.S.

Author: J.A. Buckley, W.W. Scott, S.S. Siegelman, et al.; Title: "Pulmonary nodules: effect of increased data sampling on detection with spiral CT and confidence in diagnosis"; Radiology, 196, pp. 395-400; Date of Publication: 1995; Place of Publication: U.S.

Author: Y. Kawata, N. Niki, H. Ohmatsu, M. Kusumoto, R. Kakinuma, K. Mori, N. Nishiyama, K. Eguchi, M. Kaneko, and N. Moriyama; Title: "Tracking interval changes of pulmonary nodules using a sequence of three-dimensional thoracic images"; In Medical Imaging 2000: Image Processing, Proceedings of SPIE, vol. 3979, pp. 86-96; Date of Publication: 2000; Place of Publication: U.S.

Author: Y. Kawata, N. Niki, H. Ohmatsu, M. Kusumoto, R. Kakinuma, K. Mori, N. Nishiyama, K. Eguchi, M. Kaneko, and N. Moriyama; Title: "Analysis of evolving processes in pulmonary nodules using a sequence of three-dimensional thoracic images"; in M. Sonka d K.M. Hanson, editors, *Medical Imaging 2001: Image Processing, Proceedings of SPIE*, vol. 4322, pp. 1890-1901; Date of Publication: 2001; Place of Publication: U.S.

Author: Z.-H. Cho, J. P. Jones, and M. Singh. *Foundations of Medical Imaging*. John Wiley and Sons Inc.; Title: "X-Ray Computerized Tomography", pp. 148-164; Date of Publication: 1993; Place of Publication: U.S.

Author: A. K. Jain; Title: "Fundamentals of Digital Image Processing", Prentice Hall, Englewood Cliffs, NJ; pp. 384-389; Date of Publication: 1989; Place of Publication: U.S.

Author: S. N. Reske, R. Bares, U. Bull, A. Guhlmann. E. Moser, and M. F. Wannenmacher; Title: "[Clinical value of positron emission tomography (PET) in oncologic questions: results of an interdisciplinary consensus conference. Schirmerreschaft der Deutschen Gesellschaft for Nuklearmedizin.]" (Summary in English is provided on p. 42); *Nuklearmedizin*, 35(2):42-52; Date of Publication: Apr. 1996; Place of Publication: Germany.

Author: M. D. Seemann, T. Beinert, F. Spelsberg, B. Obst, H. Dienemann, U. Fink, P. Kohz, and M. Reiser; Title: "Differentiation of solitary pulmonary coin lesions by high-resolution computerized tomography" (Summary in English provided on p. 580); *Radiology*, 36(7):579-585; Date of Publication: Jul. 1996; Place of Publication: Germany.

Author: J. Serra; *Image analysis and mathematical morphology*.; pp. 34-92; Academic Press, London; Date of Publication: 1982; Place of Publication: London.

Author: J. Serra; Title: "Introduction to Morphological Filters"; *Image analysis and mathematical morphology; vol. 2: Theoretical advances*, pp. 101-114; Academic Press, London; Date of Publication: 1988; Place of Publication: London.

Author: S. W. Tamarkim; Title: "Spiral computed tomography and computed tomographic angiography"; in J. R. Haaga, C. F. Lanzieri, D. J. Sartoris, and E. A. Zehrouni, editors, *Computed tomography and magnetic resonance imaging of the whole body*. Mosby; pp. 1694-1706; Date of Publication: 1994; Place of Publication: U.S.

Author: W. Press; Title: "Numerical Recipes in C"; 2$^{nd}$ Edition, Cambridge University Press; pp. 402-420; Date of Publication: 1992; Place of Publication: unknown.

Author: M.S. Brown, M.F. McNitt-Gray, J.G. Goldin and D.R. Aberle; Title: "Model-based segmentation architecture for lung nodule detection in CT"; *RSNA 2000 annual meeting*.

Author: S.G. Erberich, K.S. Song, H. Arakawa, H.K. Huang, R. Webb, K.S. Hoo, B.W. Loo; Title: "Knowledge-based lung nodule detection from helical CT" (Text of Publication only as Figures are not available); *RSNA 1997 annual meeting*.

Author: K. Kanazawa, M. Kubo, N. Niki, H. Satoh, H. Ohmatsu, K. Eguchi, N. Moriyama; Title: "Computer Assisted Diagnosis of Lung Cancer Using Helical X-ray CT"; *Proceedings of ICPR*, pp. 381-385; Date of Publication: 1996; Place of Publication: U.S.

Author: N. Otsu; Title: "A threshold selection method from gray-level histograms"; IEEE Trans. Systems Man Cybernet, 9(1), pp. 62-66; Date of Publication: 1979; Place of Publication: Japan.

Author: C.L. Novak, D.P. Naidich, L. Fan, J. Qian, J.P. Ko, A.N. Rubinowitz; Title: "Improving Radiologists' Confidence of Interpreting Low-dose Multidetector Lung CT screening Studies Using an Interactive CAD system"; Scientific paper presentation, RSNA 87$^{th}$ scientific assembly and annual meeting, Nov. 25-30, 2001.

Author: S. G. Armato, III, F. Li, M.L. Giger; Title: "Performance of Automated CT Lung Nodule Detection on Missed Cancers"; scientific paper presentation, RSNA 87$^{th}$ scientific assembly and annual meeting, Nov. 25-30, 2001.

Author: S.H. Heywang-Koebrunner, B. Lommatzsch, et al.; Title: "Comparison of spiral and conventional CT in the detection of pulmonary nodules(abstract)"; *Radiology, RSNA 1992 annual meeting*.

Author: M.K. Gurcan, N. Petrick, B. Sahiner, H.P. Chan, P.N. Cascade, E.A. Kazerooni, L.M. Hadjiiski; Title: "Computerized lung nodule detection on thoracic CT images: combined rule-based and statistical classifier for false positive reduction"; *SPIE*, vol. 4322, pp. 686-692; Date of Publication: 2001; Place of Publication: U.S.

Author: O. Karacan, O.A. Ibis, S. Akcay, O. Akkoca, F.O. Eyuboglu, and M. Coskun; Title: "Chest readiography and the solitary pulmonary nodule"; *Journal of Radiology*; Date of Publication: 2002; Place of Publication: unknown.

* cited by examiner

SYSTEM, METHOD AND APPARATUS FOR SMALL PULMONARY NODULE COMPUTER AIDED DIAGNOSIS FROM COMPUTED TOMOGRAPHY SCANS

CROSS-REFERENCE TO RELATED APPLICATIONS

This application is a divisional of U.S. application Ser. No. 10/688,267, filed Oct. 17, 2003, which claims the benefit of U.S. Provisional Application No. 60/419,597, filed Oct. 18, 2002, which are incorporated herein by reference.

BACKGROUND OF THE INVENTION

The present invention relates to the art of diagnostic imaging of small pulmonary nodules. In particular, the present invention is related to analyzing and manipulating computed tomography scans to: detect lung nodules and correlate a pair of segmented images of a lung nodule obtained at different times.

Lung cancer is the leading cause of cancer death in the United States. According to the American Cancer Society, there were approximately 169,400 new cases of lung cancer (90,200 among men and 79,200 among women) in the United States in the year 2002. About 154,900 lung cancer deaths were predicted for the same year, which accounts for 28% of all cancer deaths. Although survival rate of lung cancer is only 14%, results from the ELCAP project show that detection and treatment of lung cancer at early stages may improve this rate to 70%. C. I. Henschke, D. I: McCauley, D. F. Yankelevitz, D. P. Naidich, G. McGuinness, O. S. Miettinen, D. M. Libby, M. W. Pasmantier, J. Koizumi, N. K. Altorki, and J. P. Smith. "Early Lung Cancer Action Project: overall design and findings from baseline screening." Lancet Jul. 10, 1999; 354 (9173):99-105. Hence, lung cancer screening has recently received considerable attention.

In the screening process, radiologist analyze images of asymptomatic patients searching for a specific abnormality. Henschke et al reported that using low-dose CT as compared to chest radiography can improve the detection of small, non-calcified nodules at potentially more curable stage. Claudia. I. Henschke, D. P. Naidich, D. F. Yankelevitz, G. McGuinness, D. I. McCauley, J. P. Smith, D. M. Libby, M. W. Pasmantier, M. Vazquez, J. Koizumi, D. Flleder, N. K. Altorki, and O. S. Miettinen, "Early Lung Cancer Action Project: Initial Findings on Repeat Screening." Cancer Jul. 1, 2001; 92(1):153-159. The introduction of Computed Tomography (CT) scanners, particularly scanners with helical capabilities, has increased the resolution of lung images and greatly increased the number of images per screening study that must be evaluated by the radiologist. The development of the computed tomography (CT) technology and post-processing algorithms has provided radiologists with a useful tool for diagnosing lung cancers at early stages. However, current CT systems have their inherent shortcomings in that the amount of chest CT images (data) that is generated from a single CT examination, which can range from 30 to over 300 slices depending on image resolution along the scan axial direction, becomes a huge hurdle for the radiologists to interpret. Accordingly, there is a constant need for the improvement and development of diagnostic tools for enabling a radiologist to review and interpret the vast amount of information that is obtained through a CT examination.

International Publication No. WO 01/78005 A2 discloses a system and method for three dimensional image rendering and analysis, and is incorporated herein by reference. The system performs a variety of tasks that aid a radiologist in interpreting the results of a CT examination.

U.S. patent application Ser. No. 10/245,782 discloses a system and method directed to diagnostic imaging of small pulmonary nodules, and is incorporated herein by reference. The application includes methods for detection and feature extraction for size characterization, and focuses on the analysis of small pulmonary nodules that are less than 1 centimeter in size, but is also suitable for larger nodules as well.

Radiologist generally fail to detect nodules primarily due to interpretation and oversight error. The use of a computer aided detection (CAD) systems avoids these human related errors to tremendously improve diagnostic accuracy. M. Fiebich, C. Wietholt, B. C. Renger, S. G Armato, K. R. Hoffmann, D. Wormanns and S. Diederich, "Automatic detection of pulmonary nodules in low-dose screening thoracic CT ex-aminations", SPIE, vol. 3661, pp 1434-1439, 1999; S. G Armato, 111, F. Li, M. L. Giger, "Performance of Automated CT Lung Nodule Detection on Missed Cancers", scientific paper presentation, RSNA 87th scientific assembly and annual meeting, Nov. 25-30, 2001; F. Li, S. Sone, H. Abe, H. M MacMahon, S. G Armato, K. Doi, "Missed Lung Cancers in low-dose Helical CT Screening Obtained from a General Population", scientific paper presentation, RSNA 87th scientific assembly and annual meeting, Nov. 25-30, 2001; C. L Novak, D. P Naidich, L. Fan, J. Qian, J. P. Ko, A. N Rubinowitz, "Improving Radiologists' Confidence of Interpreting Low-dose Multidetector Lung CT screening Studies Using an Interactive CAD system", Scientific paper presentation, RSNA 87th scientific assembly and annual meeting, Nov. 25-30, 2001. CAD systems perform automated nodule detection in addition to providing useful visualization tools for the radiologists.

Novak et al reported an improvement in detection of potential nodules from 22 to 77% with the availability of an interactive CAD (ICAD) system for the radiologist. C. L Novak, D. P Naidich, L. Fan, J. Qian, J. P. Ko, A. N Rubinowitz, "Improving Radiologists' Confidence of Interpreting Low-dose Multidetector Lung CT screening Studies Using an Interactive CAD system", Scientific paper presentation, RSNA 87th scientific assembly and annual meeting, Nov. 25-30, 2001. Potential nodules were identified and rated with and without the ICAD tools for nodule interpretation. They concluded from their results that the interactive CAD systems significantly increase radiologists confidence when interpreting CT screening studies. In another study, Aramato et al reported that 78% of nodules missed during visual interpretation were detected by their automated method. 72% of the missed nodules were due to oversight' error, and the rest were due to interpretation error. S. G Armato, 111, F. Li, M. L. Giger, "Performance of Automated CT Lung Nodule Detection on Missed Cancers", scientific paper presentation, RSNA 87th scientific assembly and annual meeting, Nov. 25-30, 2001. All the nodules missed due to oversight error were detected by their CAD system whereas 70% of the nodules missed due to interpretation error were detected. Li et al also showed that 78% of missed nodules were detected by their computerized scheme. F. Li, S. Sone, H. Abe, H. M MacMahon, S. G Armato, K. Doi, "Missed Lung Cancers in low-dose Helical CT Screening Obtained from a General Population", scientific paper presentation, RSNA 87th scientific assembly and annual meeting, Nov. 25-30, 2001. According to them, the main reason for detection errors were difficulty in detection due to small size and low intensity, oversight due to adjacent or overlapping pulmonary vessels or fissures and lack of attention to relatively obvious nodules adjacent to the pulmonary hilum. In a related study, Fiebich et al reported a 15% improvement in detection sensitivity using their CAD system in addition the conventional film reading procedure. M. Fiebich, C. Wietholt, B. C. Renger, S. G Armato, K. R. Hoffmann, D. Wormanns and S. Diederich, "Automatic detection of pulmonary nodules in low-dose screening thoracic CT ex-aminations", SPIE, vol. 3661, pp 1434-1439, 1999.

The evolution of CT scanner technology has played an important role in the development of detection algorithms. Early low resolution whole lung CT scans had a slice thickness of 5-10 mm with a 0.5-0.6 mm in-plane resolution. Because of this low axial resolution, early computer detection algorithms were based entirely on two dimensional (slice-by-slice) image analysis techniques. Currently, multi-slice helical scanners with better axial resolution are widely available. This improvement in axial resolution permits three dimensional image analysis techniques which can detect smaller nodules.

Recent research on pulmonary nodule detection has focused on 3D region identification and feature extraction procedures followed by rule-based classification. Aramato et al implemented a computerized scheme that uses 2D and 3D extracted features from regions identified by multiple level gray-level thresholding. S. G. Armato III, M. L. Giger, J. T Blackburn, K. Doi, H. MacMahon, "Three-dimensional approach to lung nodule detection in helical CT", SPIE, vol. 3661, pp. 553-559, 1999. In this paper, they used a rolling ball algorithm to avoid missing nodules attached to the pleural surface. They reported an operating point of 85% sensitivity and 89% specificity indicating an overall sensitivity of 70% with an average of three false-positive per slice. Similarly, 2D and 3D geometrical features have been used by Gurcan et al in their detection algorithm. M. K. Gurcan, N. Petrick, B. Sahiner, H. P. Chan, P. N. Cascade, E. A. Kazerooni, L. M. Hadjiiski, "Computerized lung nodule detection on thoracic CT images: combined rule-based and statistical classifier for false positive reduction", SPIE, Vol. 4322, pp 686-692, 2001. They reported a 84% detection rate with 1.75 FPs per slice detection results tested on 17 patients with a total of 31 lung nodules. Fan et al implemented an adaptive 3D region growing algorithm followed by a classification scheme that makes use of geometric features such as diameter, volume, sphericity, mean intensity value and standard deviation of intensity. L. Fan, C. Novak, J. Qian, G. Kohl and D. Naidich, "Automatic Detection of Lung Nodules from Multi-Slice Low-Dose CT Images", SPIE, vol. 4322, pp 1828-1835, 2001. This algorithm only detects nodules with very small vasculature connections and no large solid structure attachment. Toshioka et al tested their detection algorithm which on 450 cases (15,750 images). S. Toshioka, K. Kanazawa, N. Niki, H. Satoh, H. Ohmatsu, K. Eguchi, et al, "Computer aided diagnosis system for lung cancer based on helical CT images", SPIE, vol. 3034, pp 975-984, 1997. Compared with image interpretation by 3 Radiologists, CAD detected all tumors identified as highly probable with 5 false negatives (4 of which represented tumors less than 5 mm in size) and 11 false positive cases (ranging from 2.4/case for "high probability" nodules to 7.2/case for "suspicious" nodules).

Lee et al used a template matching technique based on a genetic algorithm to detect nodules. Different templates were generated for nodules with and without an attachment to the pleural surface. Y. Lee, T. Hara, H. Fujita, S. Itoh and T. Ishigaki, "Automated Detection of Pulmonary Nodules in Helical CT images Based on an Improved Template-Matching Technique", IEEE Transactions on Medical Imaging, Vol. 20, No. 7, pp 595-604, 2001. Although, they developed an elegant mathematical model of a nodule, the algorithm resulted in a very high number of false positives (4.4 per slice) with 72% sensitivity. Other computer vison methods have also been explored for pulmonary nodule detection. Morphological analysis techniques have been utilized for detection of suspicious regions. H. Taguchi, Y. Kawata and N. Niki, H. Satoh, H. Ohmatsu, K. Eguchi, M. Kaneko and N. Moriyama, "Lung cancer detection based on helical CT images using curved surface morphology analysis", SPIE, vol 3661, pp 1307-1313, 1999. Penedo et al have developed a computer aided detection system based on a two level artificial neural network. M. G. Penedo, M. J. Carreira, A. Mosquera, and D. Cabello, "Computer-aided diagnosis: a neuralnetwork based approach to lung nodule detection", IEEE Transactions on Medical Imaging, vol. 17, no. 6, pp 872-879, 1998. The first network performs detection of suspicious regions, while the second one classify the regions based on the curvature peak on all points in the suspicious region. They recorded 89%-96% sensitivity with 5-7 FPs per slice. Artificial neural networks' capabilities have also been used by Lo et el. S-C B. Lo, S-L A. Lou, J-S Lin, M. T. Freedman, M V. Chien and S. K. Mun, "Artifical convolution neural Network techniques and applications for lung nodule detection", —IEEE transactions on medical imaging, vol. 14, no. 4, pp 711-718, 1995. In their work, Lo et al used a convolution type neural network which recorded an 82% detection rate.

Object-based deformation techniques have been incorporated into detection systems. Lou et al used deformation techniques to differentiate lung nodules from blood vessels in their 3D CT lung nodule detection system. S. L Lou, C. L Chang, K. P Lin and T. Chen, "Object based deformation technique for 3-D CT lung nodule detection", SPIE, vol 3661, pp 1544-1552.1999. This research did not address surface irregularities that occur in nodules with significant vasculature connections. Knowledge based techniques have also been used in recent research. Works of Erberich et al and Brown et al can be cited in this regard. S. G. Erberich, K. S. Song, H. Arakawa, H. K Huang, R. Webb, K. S. Hoo, B. W. Loo, "knowledge based lung nodule detection from helical CT", RSNA 1997 annual meeting; M. S. Brown and M. F. McNitt-Gray, "Method for segmenting chest CT image data using an anatomical model: preliminary results", SPIE, vol-16, no. 6, pp 828-839, 1997. Erberich et al used rule based tree to classify candidates generated using gradient Hough transformation. Detection performance statistical results were not reported in their paper. Brown et al developed a multipurpose modular knowledge based system. They demonstrated nodule detection application using this modular architecture.

A review of the prior art indicates that progress has been made on developing automated detection programs for lung nodules in helical CT scans. However, there is a large variations in performance, likely caused by the small data sets used in these studies. Much more effort is need to bring the performance of these computerized detection systems to level acceptable for clinical implementation. Most of the detection algorithms have been designed to detect a single type of a nodule (i.e nodule with a small vessel connection). Nodules with significant vessel connections or attachment to large solid structure have been either reported as a missed or not considered in the detection performance evaluation. Y. Lee, T. Hara, H. Fujita, S. Itoh and T. Ishigaki, "Automated Detection of Pulmonary Nodules in Helical CT images Based on an Improved Template-Matching Technique", IEEE Transactions on Medical Imaging, Vol. 20, No. 7, pp 595-604, 2001; L. Fan, C. Novak, J. Qian, G. Kohl and D. Naidich, "Automatic Detection of Lung Nodules from Multi-Slice Low-Dose CT Images", SPIE, vol. 4322, pp 1828-1835, 2001; M. Fiebich, C. Wietholt, B. C. Renger, S. G Armato, K. R. Hoffmann, D. Wormanns and S. Diederich, "Automatic detection of pulmonary nodules in low-dose screening thoracic CT examinations", *SPIE*, vol. 3661, pp 1434-1439, 1999. Accordingly, there is a great need for an algorithm which detects nodules with or without attachments to large solid structures with fewer false positives.

One predictor of malignancy of a pulmonary nodule in a CT image is the change in volume of the nodule. The change in volume can be measured as percent volume change or a doubling time. To obtain these measurements, two high-resolution CT scans, separated by a few months, are taken of the nodule. The nodules are segmented from the CT images and the percent volume change or doubling time is calculated using the segmented nodule volumes. The accuracy of the change in volume measurement is dependent on the consistency of the segmentations of the nodule in the two images. In the extreme case, a missegmentation of one of the nodules may adversely affect the malignancy predictor by moving the doubling time measurement above or below the threshold for malignancy.

There has been some work on tracking the change of pulmonary nodules in CT images. In Kawata et al, the pulmonary nodules are registered together using rigid-body registration and affine registration at two different stages. Y. Kawata, N. Niki, H. Ohmatsu, M. Kusumoto, R. Kakinuma, K. Mori, N. Nishiyama, K. Eguchi, M. Kaneko, and N. Moriyama. Tracking interval changes of pulmonary nodules using a sequence of three-dimensional thoracic images. In *Medical Imaging 2000: Image Processing, Proceedings of SPIE*, volume 3979, pages 86-96, 2000. The nodules are segmented using a 3-D deformable surface model and curvature features are calculated to track the temporal evolution of the nodule. This work was extended by Kawata et al, by adding an additional 3-D non-rigid deformable registration stage and the analysis was performed using a displacement field to quantify the areas of nodule growth over time. Y. Kawata, N. Niki, H. Ohmatsu, M. Kusumoto, R. Kakinuma, K. Mori, N. Nishiyama, K. Eguchi, M. Kaneko, and N. Moriyama. Analysis of evolving processes in pulmonary nodules using a sequence of three-dimensional thoracic images. In M. Sonka and K. M. Hanson, editors, *Medical Imaging 2001: Image Processing, Proceedings of SPIE*, volume 4322, pages 1890-1901, 2001. In Reeves et al, a method was introduced to estimate the growth of a nodule without the explicit use of segmentation. A. P. Reeves, W. J. Kostis, D. F. Yankelevitz, and C. I. Henschke. Analysis of small pulmonary nodules without explicit segmentation of CT images. *Radiology*, 217P:243-244, November 2000. The pulmonary nodules are registered using translation and the doubling time is calculated from the gaussian-weighted regions-of-interest. In Kostis et al, and Reeves et al, a segmentation method based on thresholding and morphological filtering is discussed. W. J. Kostis, A. P. Reeves, D. F. Yankelevitz, and C. I. Henschke. Three-dimensional segmentation of solitary pulmonary nodules from helical CT scans. In H. U. Lemke, M. W. Vannier, K. Inamura, and A. G. Farman, editors, *Proceedings of Computer Assisted Radiology and Surgery* (CARS '99), pages 203-207. Elsevier Science, June 1999; A. P. Reeves and W. J. Kostis. Computer-aided diagnosis of small pulmonary nodules. *Seminars in Ultrasound, CT, and MRI*, 21(2):116-128, April 2000. From the nodule segmentation, the volume of the nodule can be easily calculated and the doubling-time can be determined.

SUMMARY OF THE INVENTION

The present invention is directed to diagnostic imaging of small pulmonary nodules. There are two main stages in the evaluation of pulmonary nodules from CT scans: detection, in which the locations of possible nodules are identified, and characterization, in which a nodule is represented by measured features that may be used to evaluate the probability that the nodule is cancer. Currently, the most useful prediction feature is growth rate, which requires the comparison of size estimates from two CT scans recorded at different times. The present invention includes methods for detection and feature extraction for size characterization. The invention focuses on small pulmonary nodules that are less than 1 centimeter in size, but these methods are also suitable for larger nodules as well.

For the purpose of Computer Aided Diagnosis (CAD), Pulmonary nodules are dichotomized into attached nodules and isolated nodules based on their location with respect to other solid lung structures. Attached nodules are adjacent to some larger solid structure, such as the pleural surface. Isolated nodules consist of both well-circumscribed nodules and nodules that are larger than all adjacent structures, such as blood vessels or bronchi. The nodules may be solid, non-solid or part-solid. The overall analysis of a Computed Tomography scan generally entails the following:

1. Detection (a) Identify the lung regions and main bronchi from thoracic CT images (b) Separate the lungs into two major regions: (1) the lung parenchyma and (2) the lung surface region, including the pleural surface and major airways.

(c) Identify possible locations of isolated nodules in the lung parenchyma region and identify possible locations of attached nodules in the in the lung surface regions.

2. Characterization (a) Starting with a single location point within a possible nodule, identify the nodule region in the CT images. This entails locating the geometric center of the nodule and approximating its size.

(b) Given the location and approximate size of a nodule, compute characteristic features of the nodule, including robust size estimates.

The present invention identifies possible locations of isolated nodules in the lung parenchyma region within whole lung CT scans. With reference to the overall analysis listed above, this aspect corresponds to the first part of task 1(*c*). In particular, the invention addresses the detection problem of isolated nodules and expands upon the lung segmentation algorithms disclosed in U.S. patent application Ser. No. 10/245,782. The invention searches the segmented lung region with a filter to identify lung nodule candidates. A set of filters then eliminate a substantial amount of false candidates until only those with a high probability of being true nodules remain.

The present invention also includes methods for improving the consistency of pulmonary nodule segmentation using 3D rigid-body registration. The accurate repeat segmentation of lung nodules is critical to the measurement of nodule growth rate, which is the most accurate non-invasive computer based predictor of malignancy. The invention increases the accuracy of repeat segmentation by image comparison methods including (a) 3D rigid body registration, (b) histogram matching, and (c) knowledge-based matching of the vessel removal.

A preferred embodiment of the present invention is a method and apparatus for analyzing a computed tomography scan of a whole lung for lung nodules. The apparatus of the invention is a detecting unit configured with the teachings of the method of the invention. The invention can also be practiced on a machine readable medium. The method includes segmenting a first lung region and a second lung region from the computed tomography scan. The first lung region corresponds to lung parenchyma of the lung and the second lung region corresponds to at least one of a pleural surface of the lung and a surface defined by vessels within the lung. An initial list of nodule candidates is generated from the computed tomography scan within the first lung region. The list includes at least a center location and an estimated size associated with each nodule candidate. Subimages are next generated for each nodule candidate in the initial list. Streaking artifacts are then selectively removed from the subimages. The nodule candidates are filtered to eliminate false positives from the list.

In a preferred embodiment, the initial list is generated by thresholding the first lung region. Nodule candidate regions are next identified by labeling high density voxels foreground voxels. $\hat{R}_{MI}$ is determined for each foreground voxel. The local maximum $\hat{R}_{MI}$ is selected within a nodule candidate region. The limited extent criterion is next determined for each foreground voxel which corresponds to a $\hat{R}_{MI}$. The initial list of nodule candidates is generated for nodules which satisfy the limited extent criterion. The list includes at least Nc and $\hat{R}_{MI}$ associated with the corresponding foreground voxel.

In another preferred embodiment, the streaking artifact removal is accomplished by initially determining the amount of streaking artifact present in the sub-image followed by filtering the streaking artifact out from the subimage when the amount of the streaking artifact present in the sub-image exceeds Tsar. Preferably the amount of streaking artifact present in the sub-image is calculated by a metric $$S_m = \frac{1}{nmp}\sum_i^n \sum_j^m \sum_k^p ((I(i, j, k) - I(i, j+l, k))^2$$

Preferably the filtering is performed by a vertical median filter of size 1×3 and $T_{sar}$ is selected to be in a range from about 20000 to about 80000.

In another preferred embodiment, the false positives are eliminated from the list by initially determining for each nodule candidate a fraction, $F_a$, of a surface of the nodule candidate that is attached to other solid structures followed by removing the nodule candidate from the list when the fraction exceeds $T_a$.

In another preferred embodiment, the false positives are eliminated from the list by initially generating a cube wall about each nodule candidate followed by determining an intersection volume, $V_{ni}$, corresponding to portions of the nodule region associated with the nodule candidate that intersect the cube wall. Nodule candidates are removed from the list when the fraction of the intersection volume, $V_{ni}$, over the volume of the nodule candidate, $V_n$, exceeds $T_{vv}$.

A preferred embodiment of the present invention is a method and apparatus for correlating a segmentation of 3-d images of a pulmonary nodule from a high-resolution computed tomography (CT) scans. The images include a first image ($im_1$) obtained at time-1 and a second image ($im_2$) obtained at time-2. The apparatus of the invention is a registration unit configured with the teachings of the method of the invention. The invention can also be practiced on a machine readable medium. The method includes selecting a first region-of-interest ($ROI_1$) for the nodule in the first image ($im_1$) and selecting a second region-of-interest ($ROI_2$) for the nodule in the second image ($im_2$). The second region-of-interest ($ROI_2$) is registered to the first region-of-interest ($ROI_1$) to obtain a transformed second region-of-interest ($ROI_{2t}$). The nodule in the first region-of-interest ($ROI_1$) and the transformed second region-of-interest ($ROI_{2t}$) are both separately segmented. The first segmented nodule ($S_1$) and the second segmented nodule ($S_2$) are then adjusted.

In a preferred embodiment, the nodule in the first region-of-interest ($ROI_1$) and the transformed second region-of-interest ($ROI_{2t}$) are both separately segmented by performing at least one of the following:
 (i) gray-level thresholding;
 (ii) morphological filtering for vessel removal: and
 (iii) plane clipping for separating a pleural wall.

Preferably the gray-level thresholding is performed at an adaptive threshold level. The adaptive threshold level is preferably selected for each region-of-interest ($ROI_1$ and $ROI_2$) by:
 determining a peak parenchyma value, $v_p$;
 determining a peak nodule value, $v_n$;
 calculating the adaptive threshold level as a midpoint between the peak parenchyma value, $v_p$, and the peak nodule value, $v_n$.

An intensity histogram, $H(x)$ is preferably calculated for determining the peak parenchyma value, $v_p$, and the peak nodule value, $v_n$. The intensity histogram, $H(x)$, is preferably filtered with a gaussian with standard deviation of about 25 HU prior to determining the peak parenchyma value, $v_p$, and the peak nodule value, $v_n$.

In another preferred embodiment, the registration to obtain a transformed second region-of-interest ($ROI_{2t}$) is performed by:
 (a) calculating initial rigid-body transformation parameters for a rigid-body transformation on the second region-of-interest ($ROI_2$);
 (b) determining the optimum rigid-body transformation parameters by calculating a registration metric between the first region-of-interest ($ROI_1$) and the rigid-body transformation on the second region-of-interest ($ROI_2$); and
 (c) generating a registered image from the optimum rigid-body transformation parameters.

Preferably the registration metric is calculated by:
 transforming the second region-of-interest ($ROI_2$) with the initial rigid-body transformation parameters to obtain a transformed second region-of-interest ($ROI_{2t}$);
 calculating the registration metric as a mean-squared-difference (MSD) between the transformed second region-of-interest ($ROI_{2t}$) and the first region-of-interest ($ROI_1$); and
 searching for the minimum mean-squared-difference (MSD) in the 6-dimensional parameter space.

The transforming of the second region-of-interest ($ROI_2$) to obtain the transformed second region-of-interest ($ROI_{2t}$) is preferably a mapping of a point v in 3-d space to a point v' in transformed space defined by:

$$v' = RxRyRzv + \begin{bmatrix} tx \\ ty \\ tz \end{bmatrix}$$

wherein Rx, Ry, and Rz are rotation matrices defined as:

$$R_x = \begin{bmatrix} 1 & 0 & 0 \\ 0 & \cos(r_x) & -\sin(r_x) \\ 0 & \sin(r_x) & \cos(r_x) \end{bmatrix}$$

$$R_y = \begin{bmatrix} \cos(r_y) & 0 & \sin(r_y) \\ 0 & 1 & 0 \\ -\sin(r_y) & 0 & \cos(r_y) \end{bmatrix}$$

$$R_z = \begin{bmatrix} \cos(r_z) & -\sin(r_z) & 0 \\ \sin(r_z) & \cos(r_z) & 0 \\ 0 & 0 & 1 \end{bmatrix}.$$

The initial rigid-body transformation parameters preferably include six parameters (tx,ty,tz,rx,ry,rz) respectively defined as translation in x, translation in y, translation in z, rotation about the x-axis, rotation about the y-axis, and rotation about the z-axis. The initial rotation parameters (rx,ry,rz) are generally all set to zero while the initial translation parameters (tx,ty,tz) are set so that the nodule in the first region-of-interest ($ROI_1$) overlaps the nodule in the second region-of-interest ($ROI_2$) during the initial calculation of the registration metric. Preferably the mean-squared-difference (MSD) is gaussian weighted.

In another preferred embodiment, a first thresholded image ($T_1$) and a second thresholded image ($T_2$) are defined by gray-level thresholding prior to vessel removal and separating the pleural wall. The adjustment of first segmented nodule ($S_1$) and the second segmented nodule ($S_2$) is performed by comparing the segmented nodules and the thresholded images. The active pixels in the segmented nodules are marked as one of:

a repeat nodule pixel;
a nodule growth pixel;
a nodule atrophy pixel; and
a nodule missegmentation pixel.

A foreground pixel in the first segmented nodule ($S_1$) is preferably marked as a repeated nodule pixel from the first region-of-interest ($ROI_1$) to the transformed second region-of-interest ($ROI_{2t}$) when the corresponding pixel in second segmented nodule ($S_2$) and the corresponding pixel in second thresholded image ($T_2$) are both foreground. A foreground pixel in the first segmented nodule ($S_1$) is preferably marked as a nodule atrophy pixel when the corresponding pixel in second segmented nodule ($S_2$) is background and the corresponding pixel in second thresholded image ($T_2$) is background. A foreground pixel in the first segmented nodule ($S_1$) is preferably marked as a missegmented pixel in the first region-of-interest ($ROI_1$) when the corresponding pixel in second segmented nodule ($S_2$) is background and the corresponding pixel in second thresholded image ($T_2$) is foreground. A foreground pixel in the second segmented nodule ($S_2$) is preferably marked as a repeated nodule pixel from the first region-of-interest ($ROI_1$) to the transformed second region-of-interest ($ROI_{2t}$) when the corresponding pixel in first segmented nodule ($S_1$) and the corresponding pixel in first thresholded image ($T_1$) are both foreground. A foreground pixel in the second segmented nodule ($S_2$) is preferably marked as a nodule growth pixel when the corresponding pixel in first segmented nodule ($S_1$) is background and the corresponding pixel in first thresholded image ($T_1$) is background. A foreground pixel in the second segmented nodule ($S_2$) is preferably marked as a missegmented pixel in the transformed second region-of-interest ($ROI_{2t}$) when the corresponding pixel in first segmented nodule ($S_1$) is background and the corresponding pixel in first thresholded image ($T_1$) is foreground.

For a better understanding of the present invention, reference is made to the following description to be taken in conjunction with the accompanying drawings and its scope will be pointed out in the appended claims.

BRIEF DESCRIPTION OF THE DRAWINGS

Preferred embodiments of the invention have been chosen for purposes of illustration and description and are shown in the accompanying drawings, wherein.

DETAILED DESCRIPTION OF THE INVENTION

A system in accordance with the present invention may include a scanner, processor, memory, display device, input devices, such as a mouse and keyboard, and a bus connecting the various components together. The system may be coupled to a communication medium, such as a modem connected to a phone line, wireless network, or the Internet.

The present invention is preferably implemented using a general purpose digital computer, microprocessor, microcontroller, or digital signal processor programmed in accordance with the teachings of the present specification, as will be apparent to those skilled in the computer art. Appropriate software coding may be readily be prepared by skilled programmers based on the teachings of the present disclosure, as will be apparent to those skilled in the software art.

The present invention preferably includes a computer program product, which includes a storage medium comprising instructions that can be used to direct a computer to perform processes in accordance with the invention. The storage medium preferably includes, but is not limited to, any type of disk including floppy disks, optical data carriers, compact discs (CD), digital video discs (DVD), magneto-optical disks, read only memory (ROM), random access memory (RAM), electically programmable read only memory (EPROM), electrically erasable programmable read only memory (EEPROM), magnetic or optical cards, or any type of media suitable for storing information.

Stored on any one of the above described storage media, the present invention preferably includes programming for controlling both the hardware of the computer and enabling the computer to interact with a human user. Such programming may include, but is not limited to, software for implementation of device drivers, operating systems, and user applications. Such storage media preferably further includes programming or software instructions to direct the general purpose computer to perform tasks in accordance with the present invention.

The programming of the computer preferably includes software for digitizing and storing images obtained from the image acquisition device (helical computed tomography scanner). Alternatively, it should be understood that the present invention may also be implemented to process digital data derived from images obtained by other means, such as x-rays and magnetic resonance imaging (MRI), positron emission tomography (PET), ultrasound, optical tomography, and electrical impedance tomography.

The invention may also be implemented by the preparation of application specific integrated circuits (ASIC), field programmable gate arrays (FPGA), or by interconnecting the appropriate component devices, circuits, or modules, as will be apparent to those skilled in the art.

A. Nodule Detection

Figure 1:
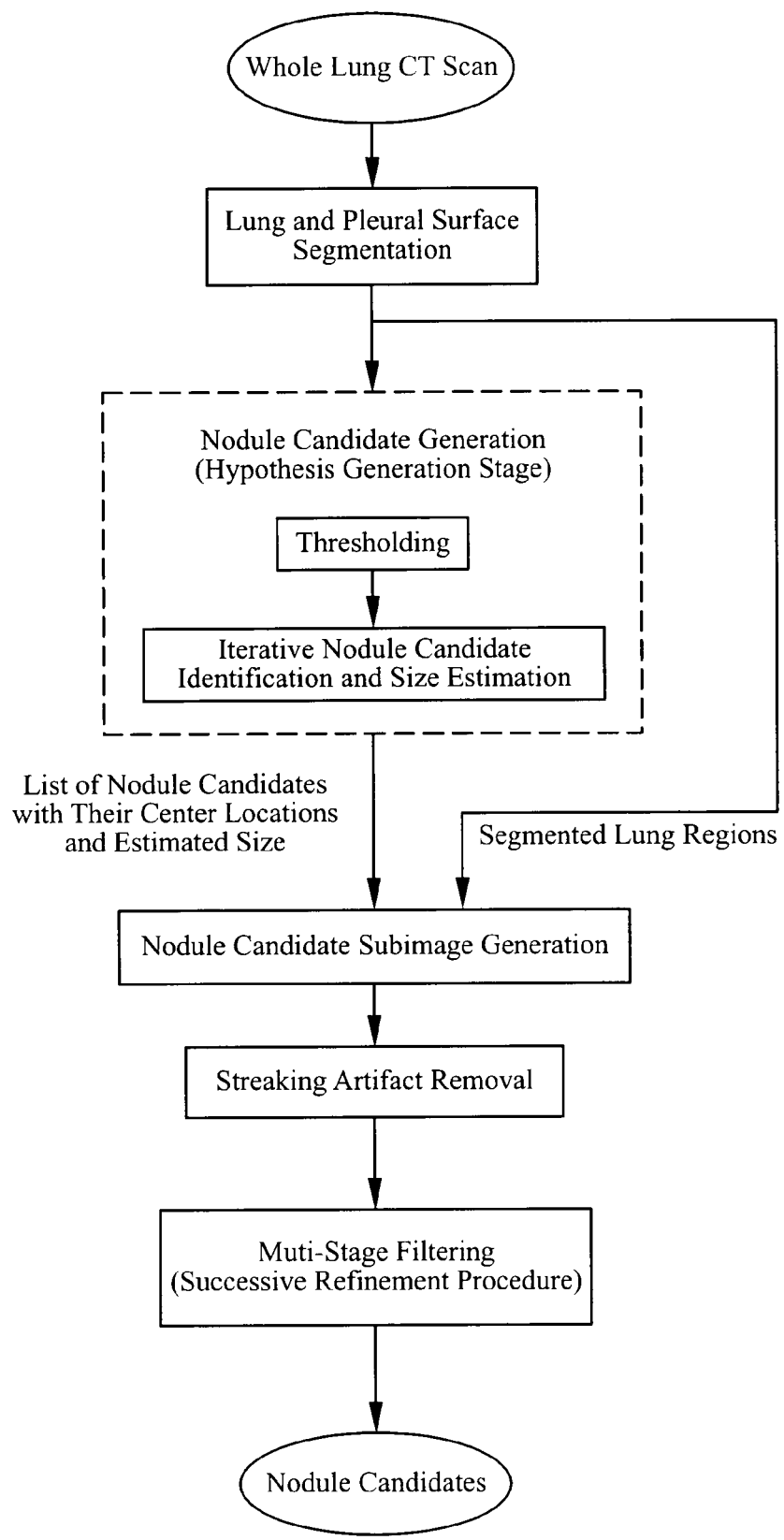
FIG. 1 is a flowchart of the automated detection algorithm.

Referring to FIG. 1, the nodule detection algorithm involves four major stages. First, lung regions are segmented from the whole lung computed tomography (CT) scan. This is followed by a hypothesis generation stage. In this stage, nodule candidate regions are identified from the whole lung scan and their size is estimated. In the third stage, the nodule candidate sub-images pass through a streaking artifact removal process. The nodule candidates are successively refined in the fourth stage using filters of increasing complexity.

Figure 2:
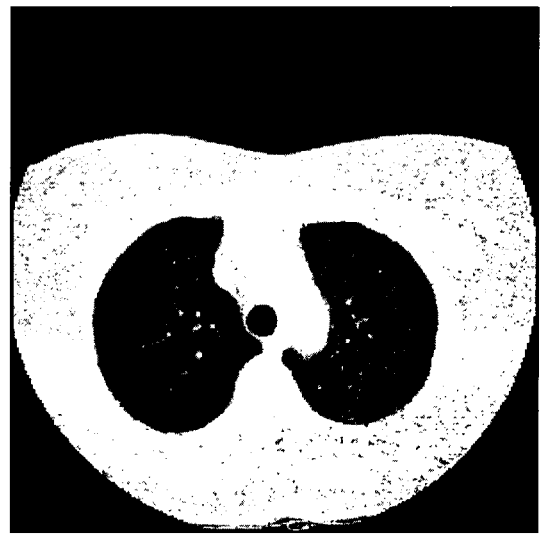
FIG. 2 is an original single axial image scan.
Figure 3:
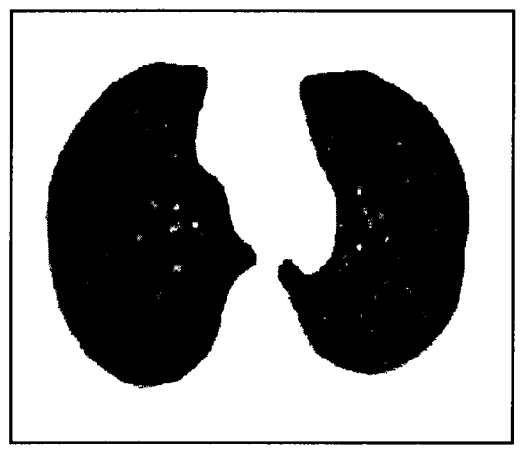
FIG. 3 illustrates the lung parenchyma after being segmented from the image shown in FIG. 2.
Figure 4:
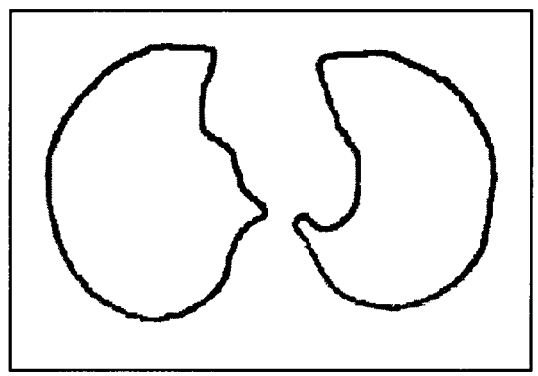
FIG. 4 illustrates the pleural surface corresponding to the surface of the volume shown in FIG. 3.

The region of the image space where pulmonary nodules are to be found is first identified. A distinction is made between the lung parenchyma where spherical nodules are located and the region of lung parenchyma adjacent to solid structures where attached nodules are located, since different techniques are used to detect the two nodule forms. Therefore, two lung regions are identified; the first lung region is the lung parenchyma which is not close to any major solid structure, and the second lung region is a narrow region of lung parenchyma that is adjacent to solid structures. In this context, major solid structures include the chest wall, the hilum region, large blood vessels and the primary bronchi. An axial slice image and its corresponding segmented regions are shown in FIGS. 2 through 4.

Figure 5:
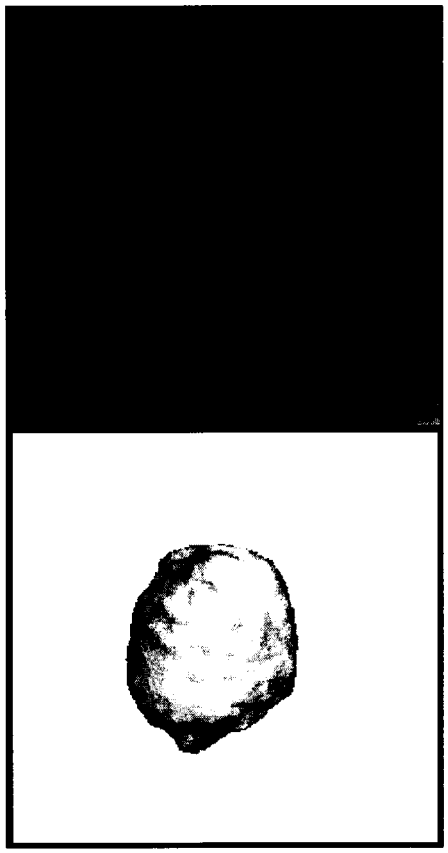
FIG. 5 illustrates an isolated pulmonary nodule.

Pulmonary solid nodules are approximately spherical shaped lesions with a density slightly greater than water. These lesions are identified on routine chest radiographs and/or low resolution CT scans of asymptomatic patients. Pulmonary nodules can be broadly classified into two groups. The first group include nodules with no attachment to a large solid structure These nodules have, in general, a spherical shape. However, the spherical shape may be distorted by other small lung structures such as vessels, bronchi, scars and regions of morbidity. Typically, growing nodules appear to wrap around such structures. An example of such a nodule is shown in FIG. 5.

Figure 6:
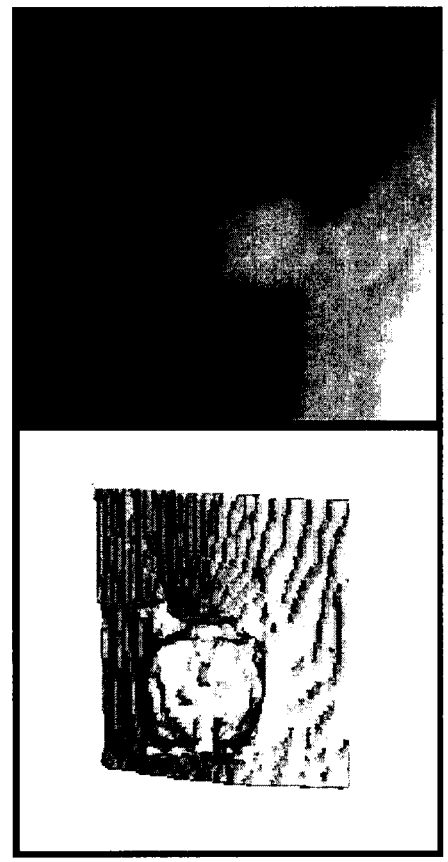
FIG. 6 illustrates an pulmonary nodule attached to pleural surface.

The second group consists of nodules attached to large dense structures, an example of which is shown in FIG. 6. In this context, large dense structures refer to those structures with a size comparable to or larger than the nodules diameter. Nodules attached to the pleural surface are the most prevalent of this type. However, nodules may also be attached to other structures such as large vessels, airways and/or the hilum region. In general, the shape of this type of nodule is significantly affected by a large adjacent structure; a nodule that is attached to a pleural surface often has the appearance of a hemisphere with the curved region growing into the lung parenchyma. The images in FIGS. 5 and 6 were created using light shaded rendering of the surface of the nodule extracted from a high resolution CT image series.

The current radiological size characterization of a nodule is its "diameter" $N_R$. For CT image scans, this diameter is estimated from a single axial slice from the central region of the nodule. One common method of size estimation is computing the average of the horizontal and vertical extents of the nodule.

For three-dimensional computer image analysis, two parameters are defined: the maximum inscribed sphere (MIS) and the minimum circumscribed sphere (MCS) that characterize the size and irregularity of a nodule in three-dimensional space. The MIS and MCS are defined with respect to the geometric center of mass (GCOM). The GCOM $N_c=(X_c, Y_c, Z_c)$ is the location of the center of mass of the nodule region assuming a uniform density (I). The GCOM for a nodule is defined as follows:

Let the three dimensional region of the nodule be defined by $f_N(x,y,z)$.

$$f_N(x, y, z) = \begin{cases} 1: & \text{if } (x, y, z) \text{ lies within the nodule region} \\ 0: & \text{otherwise} \end{cases}$$

Then, the coordinates of the GCOM $N_c=(X_c, Y_c, Z_c)$ are given by:

$$X_c = \frac{\iiint x f_N(x, y, z) dx dy dz}{\iiint f_N(x, y, z) dx dy dz} \quad (1)$$

$$Y_c = \frac{\iiint y f_N(x, y, z) dx dy dz}{\iiint f_N(x, y, z) dx dy dz} \quad (2)$$

$$Z_c = \frac{\iiint z f_N(x, y, z) dx dy dz}{\iiint f_N(x, y, z) dx dy dz} \quad (3)$$

This measurement does not consider density variations within the nodule but depends only on its geometric form. For a nodule, the minimum distance ($R_{MI}$) from the nodule geometric center ($N_c$) to the boundary of the nodule ($N_b$), specifies the radius of the MIS. That is, the maximum sized sphere that can be inscribed within the nodule centered on $N_c$.

$$R_{MI} = \frac{\min(D(N_c N_b^i(x, y, z)))}{\forall i}$$

where $N_b^i$ denote the i'th boundary point of the nodule. D denotes the Euclidean distance given by $$D_E([X_1, Y_1, X_1], [X_2, Y_2, Z_2]) = \sqrt{(X_1-X_2)^2+(Y_1+Y_2)^2+(Z_1-Z_2)^2} \quad (4)$$

Similarly the maximum distance ($R_{MC}$) from $N_c$ to the boundary of the nodule ($N_b$) specifies the radius of the MCS; i.e. the minimum sized sphere that can circumscribe the nodule centered on $N_c$ touching the boundary of the nodule.

$$R_{MC} = \frac{\max(D(N_c N_b^i(x, y, z)))}{\forall i}$$

For the case when a nodule has a highly irregular shape such that $N_c$ does not lie within the nodule, the definition of $R_{MI}$ is further refined to be the minimum distance to the boundary from $N_c$ in which a change from inside to outside the nodule occurs. Similarly, the definition of $R_{MC}$ can be modified to the maximum distance to the boundary from $N_c$ in which a change from inside to outside the nodule occurs. However, such a situation will occur very rarely in practice.

Figure 7:
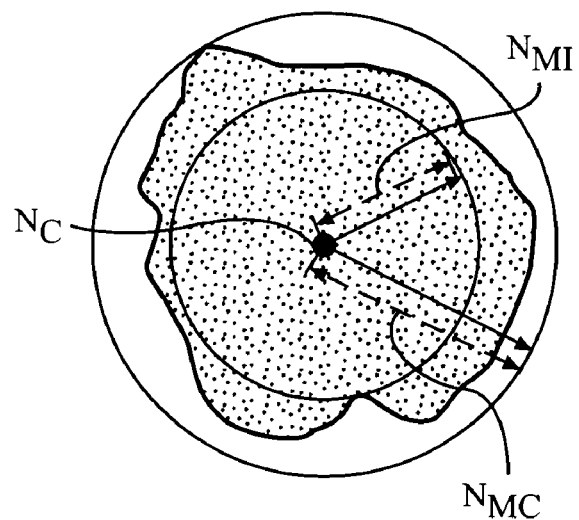
FIG. 7 is a 2-dimensional illustration of $R_{MI}$ and $R_{MC}$.

The concepts of $R_{MI}$ and $R_{MC}$ are illustrated on a 2-dimensional example shown in FIG. 7. In the Figure, $R_{MI}$ and $R_{MC}$ are the maximum inscribed and minimum circumscribed circle radii for the image region shown respectively. The extension to 3-dimension is straightforward.

In the hypothesis generation stage, nodule candidates are identified from the whole lung scan and their size is estimated. It is critical that no nodules are missed at this stage. However, since the search space is very large, it is also important that this process be computationally efficient. The nodule candidates are refined in the subsequent stages.

First, the lung parenchyma intensity is thresholded using a global threshold parameter ($T_g$). This parameter can be determined empirically from a training dataset to separate lung parenchyma tissue and high density solid structures. $T_g$ is preferably determined as approximately the mid-value between the mean value for solid tissue and the mean value for lung parenchyma. A preferred value for $T_g$ is −574 HU. During the thresholding procedure, high density anatomical structure voxels having values higher than $T_g$ are labeled as foreground voxels, creating a binary image.

Let $S(r,c)$ denote a spherical region with radius r centered at point $c=(X_c, Y_c, Z_c)$. Consider a nodule N and its characteristic spheres ($S(R_{MI}, N_c)$ and $S(R_{MC}, N_c)$) as illustrated in FIG. 7. In general, for a nodule N, the center is always at $N_c$ which may be dropped such that $S(R_{MI})=S(R_{MI},N_c)$. A binary image representation of this nodule should have the following properties.

a. All voxels within $S(R_{MI})$ should be one.
  b. All voxels outside $S(R_{MC})$ should be zero.
  c. Within the spherical shell region ($S(R_{MC})-S(R_{MI})$), there will be voxels of both values due to the irregular surface of the nodule.

In order to generate a hypothesis for a nodule of size $R_{MI}$ at a location $P=(x, y, z)$ in the binary lung parenchyma image, the following two criteria be met:

a. "Solid center": A large fraction ($T_v$) of voxels in $S(R_{MI})$ centered at P must be one.
  b. "Limited extent": A large fraction ($T_{av}$) of voxels in the region ($S(R_{MC}+\delta)-S(R_{MC})$) centered at P must be zero.

where $\delta$ is a certain constant distance. The "Solid center" criterion (a) ensures that the nodule consists of a dense mass; the threshold $T_v$ allows for some voxels to be zero due to image noise.

While the nodule is bounded by radius $R_{MI}$, there may be other dense structures in the lung region some of which may be adjacent or touching the nodule N. The "Limited extent" criterion (b) verifies the finite extent of the nodule region. However, it also allows a small amount of foreground voxels in the region immediately surrounding the nodule due to adjacent or attached structures. The preferred ranges and values for $T_v$, $T_{av}$ and $\delta$ as noted below were determined empirically from an analysis of a set of images in the training dataset.

The hypothesis generation stage is implemented as follows:

1. For each foreground voxel $F_P$, compute the maximum inscribed sphere radius, $R_{MI}$, for which the solid center criterion (a) is true.
  2. Select only the voxels with local maximum $R_{MI}$ values.
  3. For all voxels identified in step 2, determine the limited extent criterion (b).

4. Make a list of nodule candidates of all voxels which satisfy the limited extent criterion (b) in step 3, including their center coordinates ($N_c$) and their size estimate $\hat{R}_{MI}$.

Figure 8:
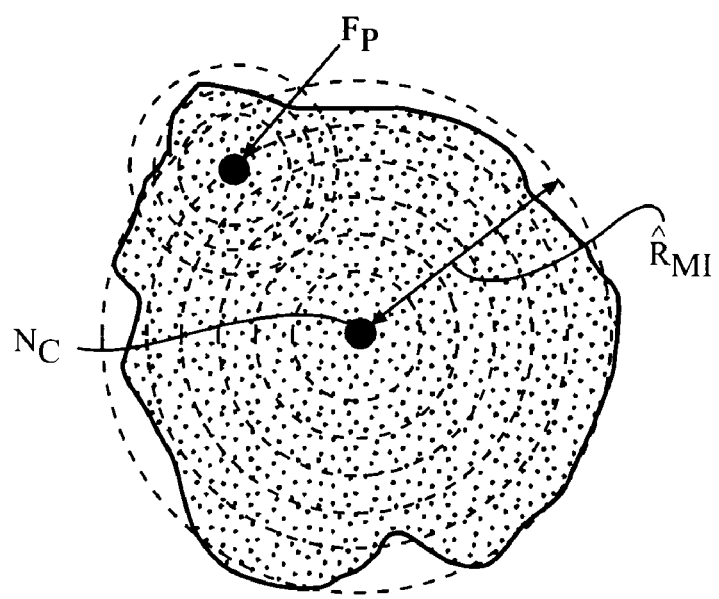
FIG. 8 is a 2-dimensional illustration of volume occupancy procedure.

First, approximate spherical regions are identified and their size is estimated. Kanazawa et al. used gray weighted distance transforms for this purpose. K. Kanazawa, M. Kubo, N. Niki, H. Satoh, H. Ohmatsu, K. Eguchi, N. Moriyama, "Computer Assisted Diagnosis of Lung Cancer Using Helical X-ray CT", Proceedings of ICPR, pp 381-385, 1996. After computing the distance transform, Kanazawa et al. used a thinning procedure to determine the center point of the nodule candidate. In the present invention, a different noise tolerant procedure has been implemented. This procedure makes use of a volume occupancy calculation. Volume occupancy, at a particular foreground voxel ($F_p$), is defined as the ratio of the number of foreground voxels within a sphere ($S(r, F_p)$) to the volume of the sphere. The procedure is illustrated for a 2D region in FIG. 8 where $F_p$ represents any seed pixel in the region R. For a 2D region, a circle is used rather than a sphere and an area coverage is calculated instead of a volume occupancy. The basic idea is to search for a center point pixel location in the region R at which the largest size circle can fit. This pixel corresponds to $N_c$ for region R in FIG. 8.

The algorithm starts with an initial point $F_p$ within the region and a circle of certain initial small radius. If the area coverage for this particular circle centered at $F_p$ is greater than the threshold $T_v$, the circle radius is incremented. This is sequentially done until the area coverage is less than $T_v$. $T_v$ is preferably selected to be in a range between about 0.70 and 1.00, and most preferably about 0.80. The final circle size approximates the maximum circle size that can be fit in the region centered at location $F_p$. This procedure is performed for all the points in the region. Every point in the region would have a maximum circle radius associated with it. The region pixel that registered the largest circle size is marked as the center point and the size is recorded as an estimate of the maximum inscribed circle ($\hat{R}_{MI}$). The computational efficiency of this procedure is significantly improved by updating the region pixels list at every iteration. The extension of this concept to 3D regions is straightforward using a spherical kernel and volume occupancy calculation as described above.

After identifying the center point ($N_c$) of the nodule candidate region and measuring its maximum inscribed sphere's radius ($R_{MI}$), the next step is the determination and analysis of the immediately adjacent regions.

Figure 9:
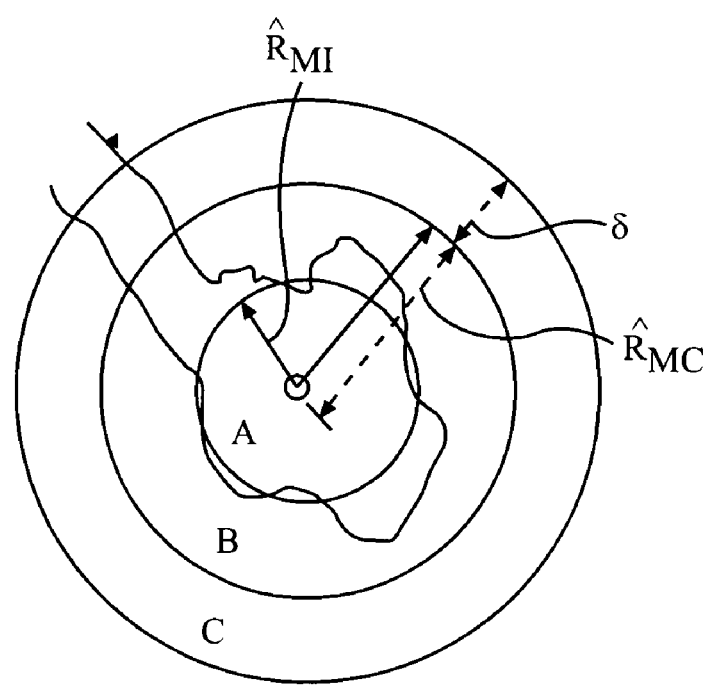
FIG. 9 illustrates the spherical shell used for nodule adjacent region analysis.

The volume occupancy of a spherical shell enclosing the nodule candidate is used to evaluate the degree of attached structures. The inner radius of this shell is $\hat{R}_{MI}$ i.e the estimated maximum inscribed sphere corresponding to $R_{MI}$. The middle sphere has a radius of $\hat{R}_{MC}$ which is obtained from a precomputed table of values for a given $R_{MI}$. The outer spherical shell has a preset thickness of $\delta$ as shown in FIG. 9. The $\hat{R}_{MC}$ can also be calculated as the radius of a sphere having a volume between 2.5 and 3.5 times that of the maximum inscribed sphere, $R_{MI}$. The preferred value of $\hat{R}_{MC}$ can be calculated as $\sqrt[3]{\sqrt{3}}*R_{MI}$. The $\delta$ can be calculated as the radius of a sphere with a volume between 5.5 and 6.5 times the maximum inscribed sphere, $R_{MI}$, minus $\hat{R}_{MC}$. The preferred value of $\delta$ can be calculated as $\sqrt[3]{\sqrt{6}}*R_{MI}-\hat{R}_{MC}$.

High density voxels in Region C correspond to attached structures. The center location $N_c$ is then labeled as a nodule candidate if the ratio of the total volume ($V_c$) of high density voxels in the adjacent region C to the nodule candidate volume ($V_N$) is less than a certain threshold ($T_{av}$). This rule is referred to as the adjacent region rule (AJR):

$$\frac{V_C}{V_N} \leq T_{av} \tag{5}$$

where $T_{av}$ is the threshold value. $T_{av}$ is preferably selected to be in a range between about 0.00 and 0.50, and most preferably about 0.28.

After the initial list of nodule candidates is generated, a subimage for each candidate is preferably generated by clipping a region surrounding each nodule candidate to simplify data management. The subimages are basically segmented from the original whole lung CT scan. In an alternative embodiment of the invention, the subimage generation step could be skipped and the refinements described below (e.g. streaking artifact removal and multi-stage filtering) could be applied to the whole lung CT scan.

The occurrence of CT image artifacts such as streaking poses a major problem for the detection of very small nodules. Streaking artifacts are caused by starvation of the x-ray photon flux and beam hardening effects. A majority of the streaking artifact occur near the patient shoulder area or when the patient arms are inside the scan FOV. Photon deficiency is limited to the projections that pass through both shoulders of the patient and result in a horizontal streaking pattern. Jiang Hsieh, "Generalized adaptive median filters and their application in computed tomography", SPIE, vol. 2298, pp. 662-669, 1994.

Geometric characteristics of nodule candidates are used in the nodule candidate refinement stage. Artifacts deform geometrical properties of nodules resulting in true nodule elimination. A streaking artifact filter is preferably selectively applied to avoid deformation or elimination of small nodules.

The present invention implements an adaptive streaking artifact removal filtering technique. After nodule candidate generation, individual nodule candidate sub-images are selectively filtered based on the amount of streaking artifact present. For this purpose, streaking artifact quantification metric ($S_m$) is introduced. This metric is calculated by averaging the square difference between two consecutive rows over the nodule candidate subimage.

$$S_m = \frac{1}{nmp}\sum_i^n \sum_j^m \sum_k^p ((I(i,j,k) - I(i,j+1,k))^2 \tag{6}$$

The metric Sm is defined with respect to a global coordinate system as follows:
the X axis runs between a patient's shoulders;
the Y axis runs between a patient's chest and back; and
the Z axis runs along the length of a patient's body, where i, j, and k are indices for X, Y and Z coordinates respectively and n, m and p are the dimensions of the subimage in X, Y and Z directions respectively.

Figure 10:
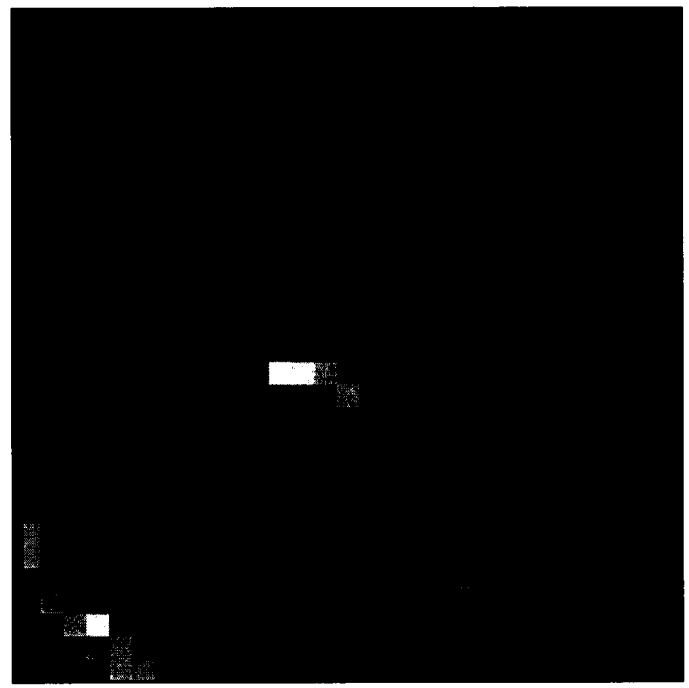
FIG. 10 illustrates a nodule sub-image before streaking artifact removal.
Figure 11:
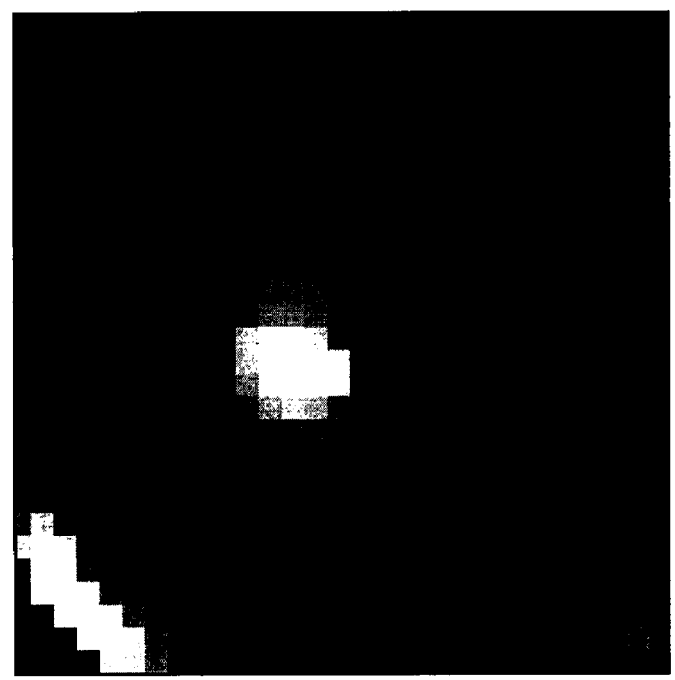
FIG. 11 illustrates a nodule sub-image after streaking artifact removal.

A streaking artifact filter is applied for nodule candidate sub-images with a metric value greater than an empirically selected threshold, $T_{sar}$. The preferred range for $T_{sar}$ is between 55,000 and 65,000 HU$^2$. The preferred value of $T_{sar}$ is about 60,000 HU$^2$, which corresponds to a pixel pair variation of about 245 HU. In the present invention, a median filter is implemented. Because of horizontal nature of the streaking artifact, vertical median filters are used. Preferably a vertical median filter of size 1×3 is selected. FIGS. 10 and 11 illustrate a nodule sub-image before and after streaking artifact removal.

Figure 12:
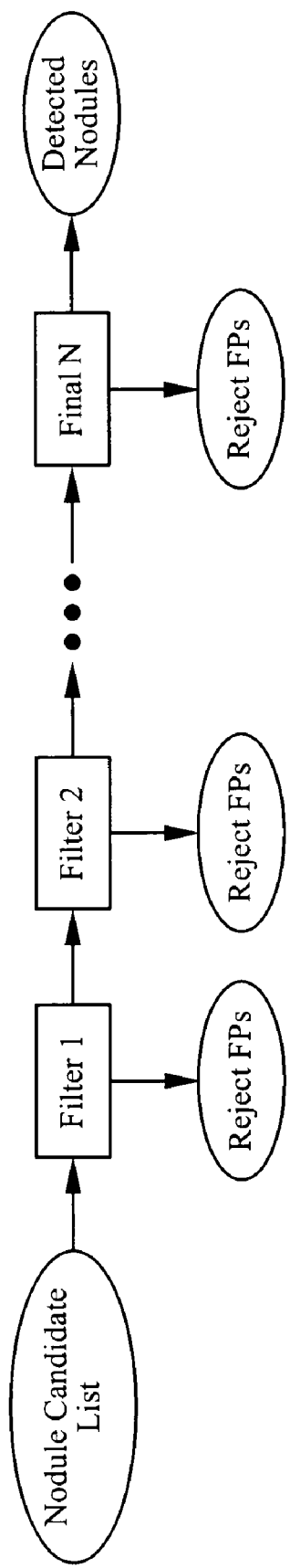
FIG. 12 illustrates a multi-stage filtering procedure for successive refinement of the nodule candidates.

A multi-stage filtering procedure, illustrated in FIG. 12, is used to reduce the number of false positive candidate regions. This approach is effective in minimizing the computation time without sacrificing performance. The present invention preferably employs at least two filters. The first filter removes vessels and large vessel bifurcation points from the nodule candidate list. A large percentage of false positives are eliminated by the first filter. The nodule candidates list is then further refined by the second filter, which removes small bifurcation points. A detailed description of each filter is presented below.

Nodule candidates generated in the hypothesis generation stage include nodules, blood vessels and bifurcation points which passed the AJR criterion. The objective of the first filtering stage is to remove blood vessels and large vessel bifurcation points from the nodule candidate list.

Figure 13:
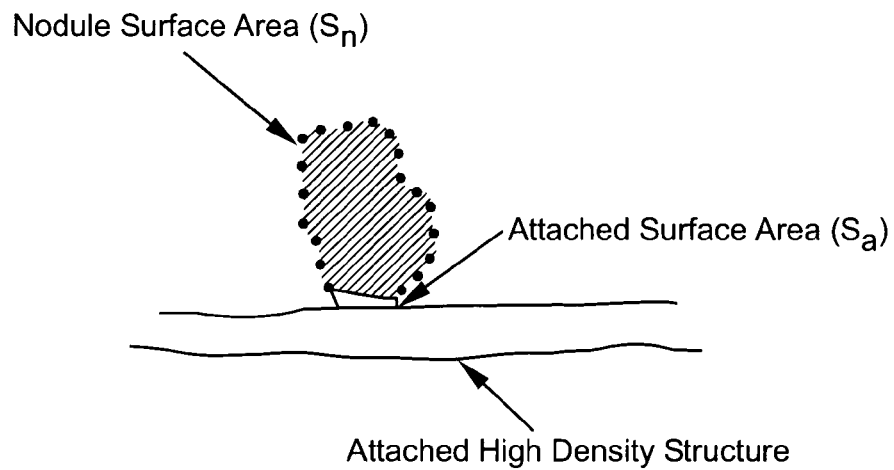
FIG. 13 illustrates nodule candidate attachment analysis.

In this first filtering stage, the nodule candidate list is refined based on each nodule candidate's attachment surface area to other structures as shown in FIG. 13. For this purpose, a fraction ($F_a$) of the nodule surface that is attached to other solid structure is calculated by $$F_a = S_a/S_n \qquad (7)$$

where $S_n$ denotes the surface area of the nodule candidate and $S_a$ denotes the attachment surface area to all other structures.

Nodule candidates can be categorized into two groups based on the value of $F_a$. The first group consists of vessels and large bifurcation points which have high values of $F_a$. The second group consists of nodules and very small bifurcation points. These nodule candidates have values of $F_a$ smaller than the first group. A threshold can be used to eliminate the first group i.e vessels and large bifurcation points, based on the value of $F_a$.

To estimate $F_a$, we need to find the outer surface of the nodule. This is achieved by a region growing algorithm starting from $\hat{R}_{MI}$ and incrementing by a spherical layer until the anticipated $\hat{R}_{MC}$ is reached. At this point, $F_a$ is computed. $\hat{R}_{MC}$ is obtained from a precomputed table of values for a given $R_{MI}$.

The current implementation of the procedure is described for a 2D region as follows.

Figure 14:
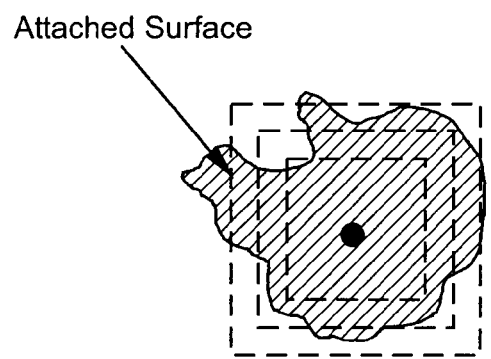
FIG. 14 illustrates the region growing procedure for the attachment analysis.

1. $\hat{R}_{MC}$ is obtained from a precomputed table of values for a given $R_{MI}$.
2. For simplicity and efficiency, a rectangular rather than spherical region growing procedure is used. This is illustrated for a 2D region in FIG. 14. Starting with a square region, the size is incremented by one pixel on all sides during every iteration. This iteration is repeated until the size of the square matches $\hat{R}_{MC}$. The pixels at the edges of the square region that are connected to the labeled nodule region are used to estimate $\hat{S}_a$. The labeled nodule region is used to estimate $\hat{S}_n$. The extension to three dimension is straightforward except for the anisotropic sampling space in low resolution CT scans. The 3D region growing algorithm increments at a different rate in the axial direction than in the in-plane direction. This growth rate is inversely proportional to the image resolution. For example, if the ratio of axial to in-plane resolution in an image is 3:1, then three iterations of region growing is performed in the in-plane direction before growing once in the axial direction.
3. $\hat{F}_a$ is estimated from $\hat{S}_a/\hat{S}_n$.
4. If $\hat{F}_a \geq T_a$, the nodule candidate is discarded. $T_a$ is an empirically selected threshold representing the ratio of vessel attachment area to the total surface area of the nodule. $T_a$ is preferably selected to be in a range between about 0.10 and 0.45, and most preferably about 0.24.

Figure 15:
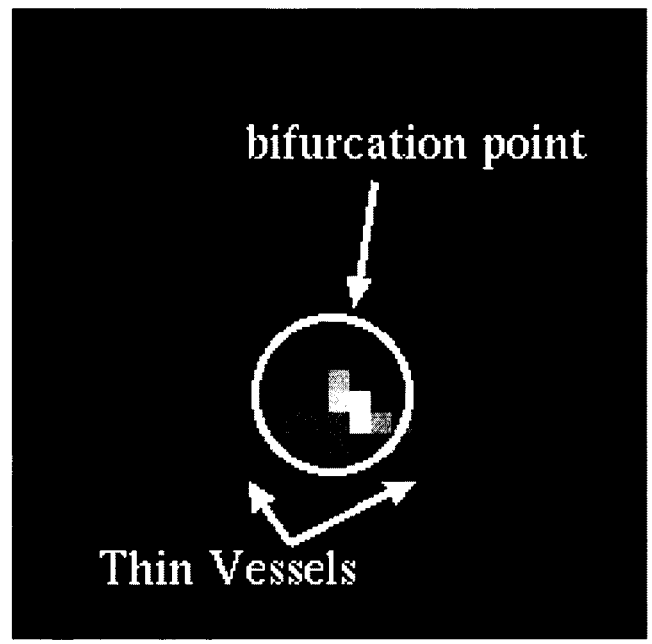
FIG. 15 illustrates the effect of global thresholding on small vessel bifurcation points on the original gray scale image.
Figure 16:
FIG. 16 illustrates the effect of global thresholding on small vessel bifurcation points on the binary image.

After the first filter, the majority of false positives are small (2 mm size) vessel bifurcation points. Small vessel bifurcation points occur at junctions of small vessels. During global intensity thresholding procedure in the hypothesis generation stage, small vessels are often eliminated leaving the bifurcation point as a compact shape region with very small attachment (as shown in FIG. 15). This is due to the partial voxels effect. The nodule attachment analysis technique used in the previous stage generally does not identify these situations since the vessels were not present.

Figure 17:
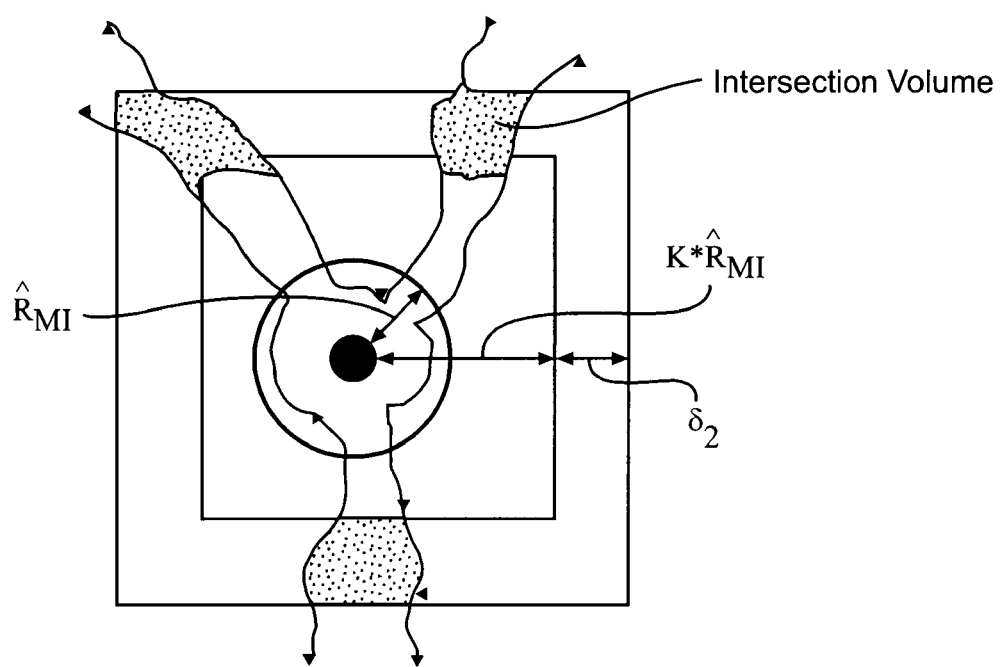
FIG. 17 illustrates small bifurcation point removal.

The second filter eliminates bifurcation points from the nodule candidate list. A hollow cube with a certain wall thickness is used as shown in FIG. 17. The cube has an inner side length determined from nodule candidate radius $\hat{R}_{MI}$ multiplied by a scale factor K and thickness $\delta_2$ empirically selected. The preferred range of K is between 1.5 and 2.5 and is preferably about 2. The thickness $\delta_2$ preferably has a minimum value of 1 and should be large enough to achieve noise insensitivity. The preferred range of $\delta_2$ is between 2 and 6 voxels and is preferably 4 voxels. The volume ratio, $A_{vr}$ is then defined using the volume of the intersection $V_{ni}$ of the cube wall with the nodule candidate region and the nodule candidate volume $V_n$ as shown in equation 8. $\hat{R}_{MI}$ is used to calculate $V_n$. Bifurcation points have a higher $A_{vr}$ value compared to small nodules. The threshold parameter used for this measure is $T_{vv}$. The preferred range for $T_{vv}$ is from about −774 to −674 HU, and is most preferably selected to be about −724 HU.

$$A_{vr} = V_{ni}/V_n \qquad (8)$$

B. Pulmonary Nodule Registration

Two high-resolution CT images are needed in order to measure the volume change of a nodule. The nodule is segmented from both CT images, and the percent volume change and the doubling time are calculated. With current methods, the segmentation of the nodule in the first image is independent from the segmentation of the nodule in the second image. The consistency of the nodule segmentation between the two images is improved by comparing the segmentation from the first image with the segmentation from the second image.

A region-of-interest (ROI) is selected for the nodule in both of the CT images. The adaptive threshold is selected for each ROI using the histogram of the region, and both ROIs are then resampled to isotropic space.

To facilitate a meaningful comparison, the second ROI is registered to the first ROI. A rigid-body transformation model is assumed, meaning that in general the structures in the ROIs are confined to only translation and rotation. This is a valid assumption because the registration will be performed on a small focused area in the lungs. Thus, it is not expected that the region will change dramatically with the different levels of inspiration that may occur during the two CT scans. Registering the second nodule to the first nodule will change the location and orientation of the second nodule while preserving its volume and shape.

After rigid-body registration, the nodule from the first image and the nodule from the second image will have the same orientation and position. The nodule is segmented from first image and from the registered second image using gray-level thresholding. The attached vessels are removed using iterative morphological filtering, and any pleural attachments axe removed using an iterative clipping plane.

The nodule segmentation of the two ROIs produces two binary images representing a nodule at two different times.

The nodule from the second image has been registered with the nodule in the first image. By looking at the corresponding pixels between the segmented nodules and the thresoddnd images, it is possible to label the pixels in the segmented nodules as nodule repeat pixel, nodule growth pixels, nodule atrophy pixels, or missegmented pixels. The nodule segmentations are adjusted by removing the missegmented pixels. This improves the consistency of the segmentations of the nodule in two different times, thus improving the accuracy of the volume measurements.

The algorithm for the registered segmentation procedure is as follows:
1. Select a Region-Of-Interest for the nodule in the two images.
2. Adaptive thresholding selection.
3. Isotropic resampling.
4. Register the second nodule to the first nodule using the rigid-body transformation.
5. Perform segmentation on both of the nodules:
  (a) Gray-level thresholding using adaptive threshold.
  (b) Vessel Segmentation using iterative morphological filtering.
  (c) Pleural Wall Segmentation using a clipping plane.
6. Rule-Based adjustment of the two nodule segmentations.

The details of each step are explained below.

A typical 3D high-resolution CT scan may contain anywhere from 5 to 30 image slices. Each image slice has a resolution of 512×512 pixels. A small cubic region-of-interest with a size of about three times the diameter of the nodule is selected. Selecting a small ROI will reduce the amount of computation needed to register and segment the nodule.

The segmentation of nodule tissue from lung parenchyma can be achieved by either a fixed gray-level threshold or by an adaptive threshold. The threshold is selected by choosing a value that best separates the nodule (foreground) from the lung parenchyma (background), which in the normal case is bimodal intensity histogram (see FIG. 18). This separation may be achieved by selection of a threshold that falls at the midpoint between the peaks of each mode of the histogram.

The fixed threshold is selected using the mean values of lung parenchyma and solid nodule tissue compiled over several cases. The mean value of lung parenchyma and solid nodule tissue was determined to be −880 HU and −27 HU, respectively. Thus, the fixed threshold was calculated to be −453 HU.

However, a fixed threshold does not take into account the change in lung parenchyma density due to inspiration of the lungs. A study of CT scans by the inventors determined that the density of the parenchyma around the nodule changed on average 9.7 HU±stddev 7.0 HU (maximum of 21 HU) between repeat scans of the same patient. Furthermore, it was observed that the lung parenchyma density increases towards the back of the lungs when the patient is on his back because of the accumulation of blood due to gravity. In addition, a fixed threshold is not robust to changes in attenuation values due to differences in X-ray dosage and other CT scan parameters.

Preferably an adaptive threshold is used to improve over the limitations of the fixed threshold. The present invention adaptively selects an optimal threshold for each nodule region-of-interest. Given a nodule region-of-interest, a histogram is calculated between −1024 HU and 476 HU using a bin size of 1 HU. The histogram may be noisy because of the small bin size. Accordingly, the histogram is smoothed by filtering with a Gaussian with a standard deviation of 25 HU.

Figure 18:
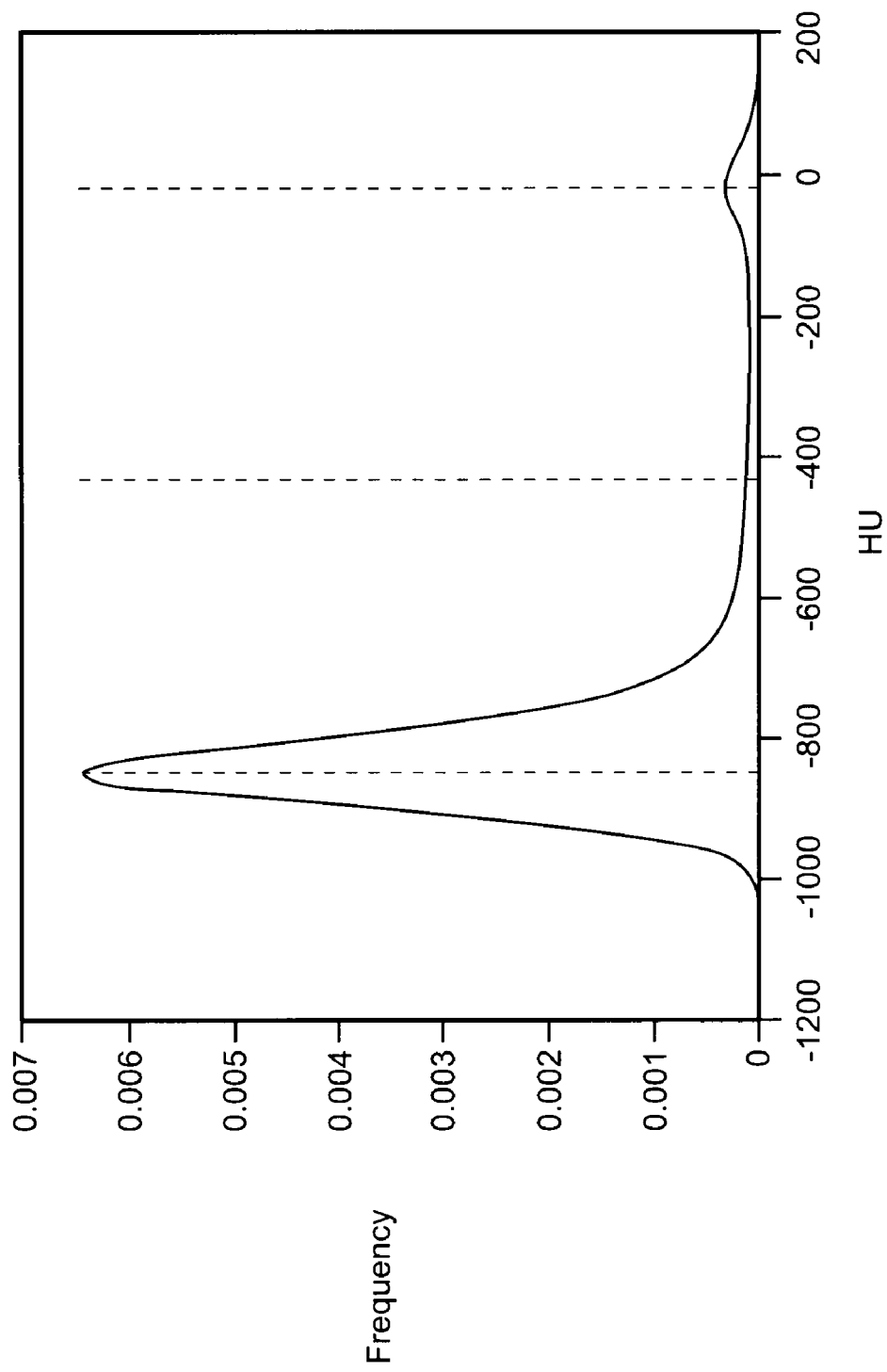
FIG. 18 is a histogram of a real 12 mm nodule between −1200 HU and 200 HU.
Figure 19:
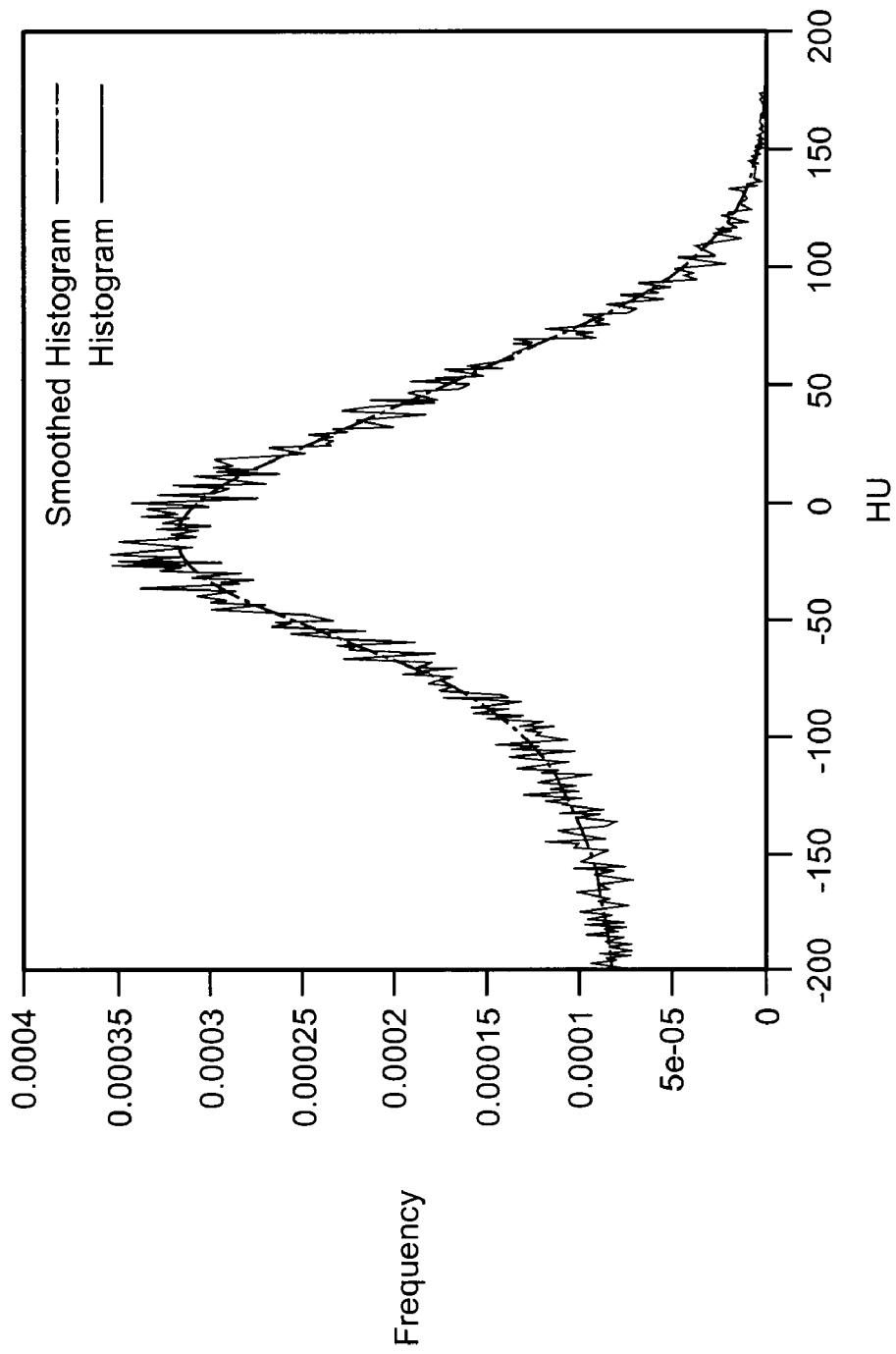
FIG. 19 is a histogram of a real 12 mm nodule between −200 HU and 200 HU.
Figure 20:
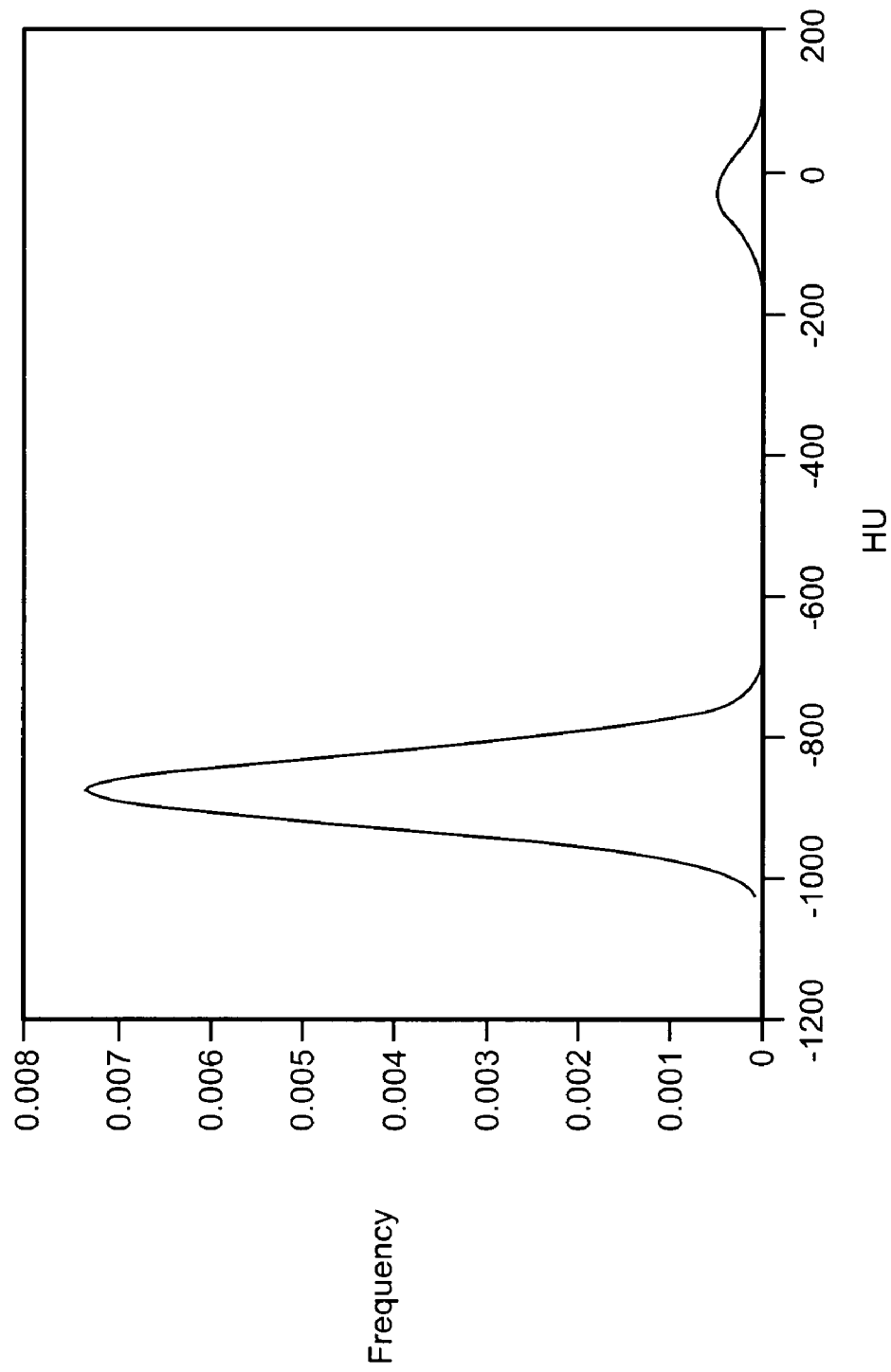
FIG. 20 is a histogram of an ideal nodule between −1200 HU and 200 HU.
Figure 21:
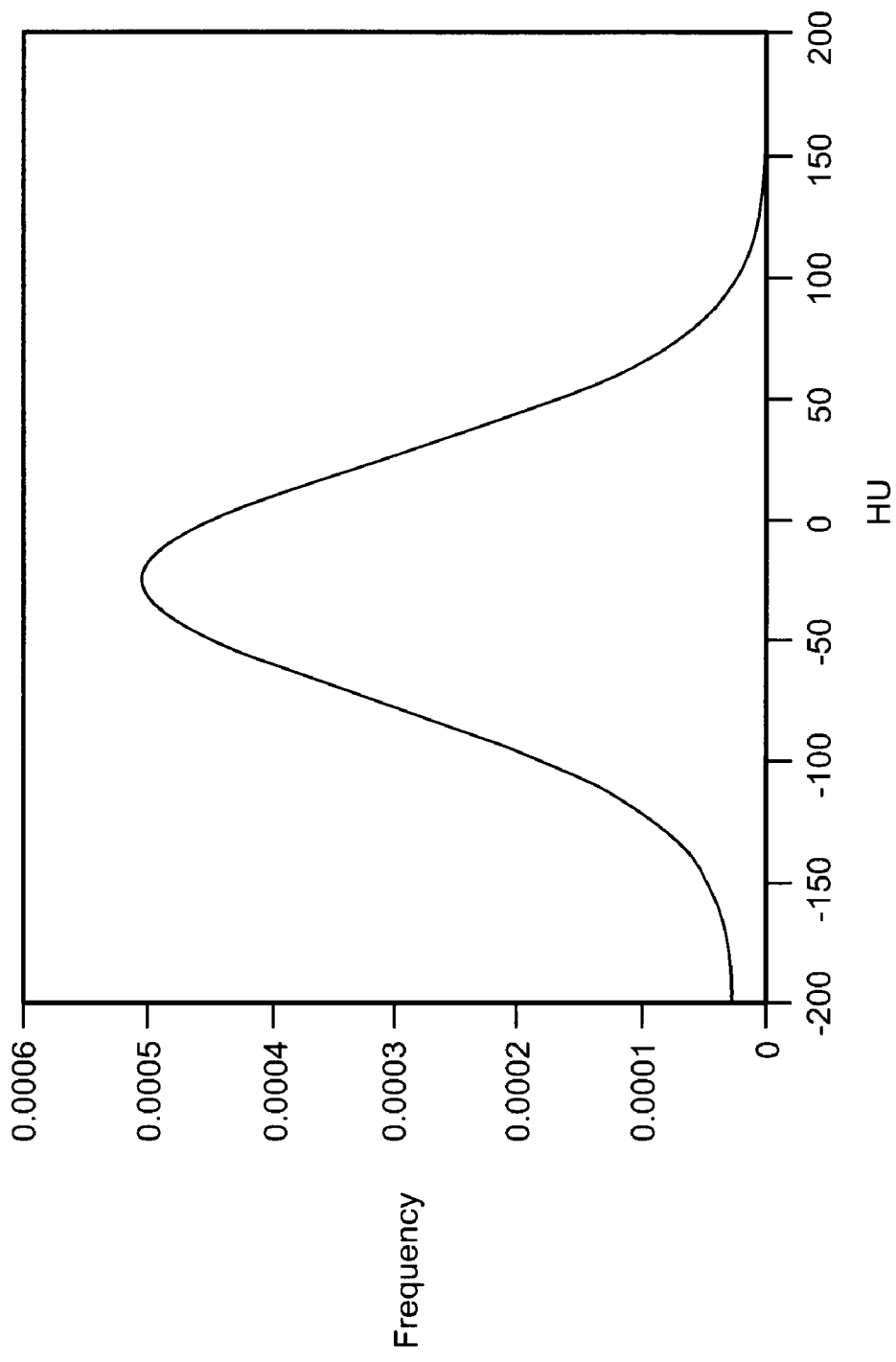
FIG. 21 is a histogram of an ideal nodule between −1200 HU and 200 HU.

The peak values of parenchyma and solid nodule are expected to be relatively close to the mean values calculated over several cases. Thus, the peak parenchyma value calculated by searching over a range of 200 HU from the ideal value of −880 HU. Similarly, the peak solid nodule value is determined by searching over ±200 HU from the ideal value of −27 HU. Finally, the adaptive threshold is calculated as the midpoint between the two peak values. The adaptive threshold selection algorithm is as follows:
1. Given a nodule region-of-interest:
2. Calculate the histogram, H(x), between −1024 HU and 476 HU with a bin size of 1.
3. Filter H(x) with a Gaussian with stddev of 25 HU.
4. Peak Parenchyma: $v_p = \max_{-1024 \leq x \leq -680} H(x)$
5. Peak Nodule: $v_n = \max_{-227 \leq x < 173} H(x)$
6. Adaptive Threshold: $th_a = (v_p + v_n)/2$ FIG. 18 shows an example histogram of a 12 mm nodule. The parenchyma peak and solid tissue peak were determined to be −848 HU and −16 HU respectively. The adaptive threshold was then calculated as −432 HU, as opposed to −453 HU for the fixed threshold. The histogram around the solid-tissue peak is seen in FIG. 21. FIGS. 20 and 21 shows the histogram of an ideal 12 mm nodule. The histogram of the real nodule has more voxels in the transition region between parenchyma and solid tissue because it contains partial voxels from small vessels and other objects.

Figure 22:
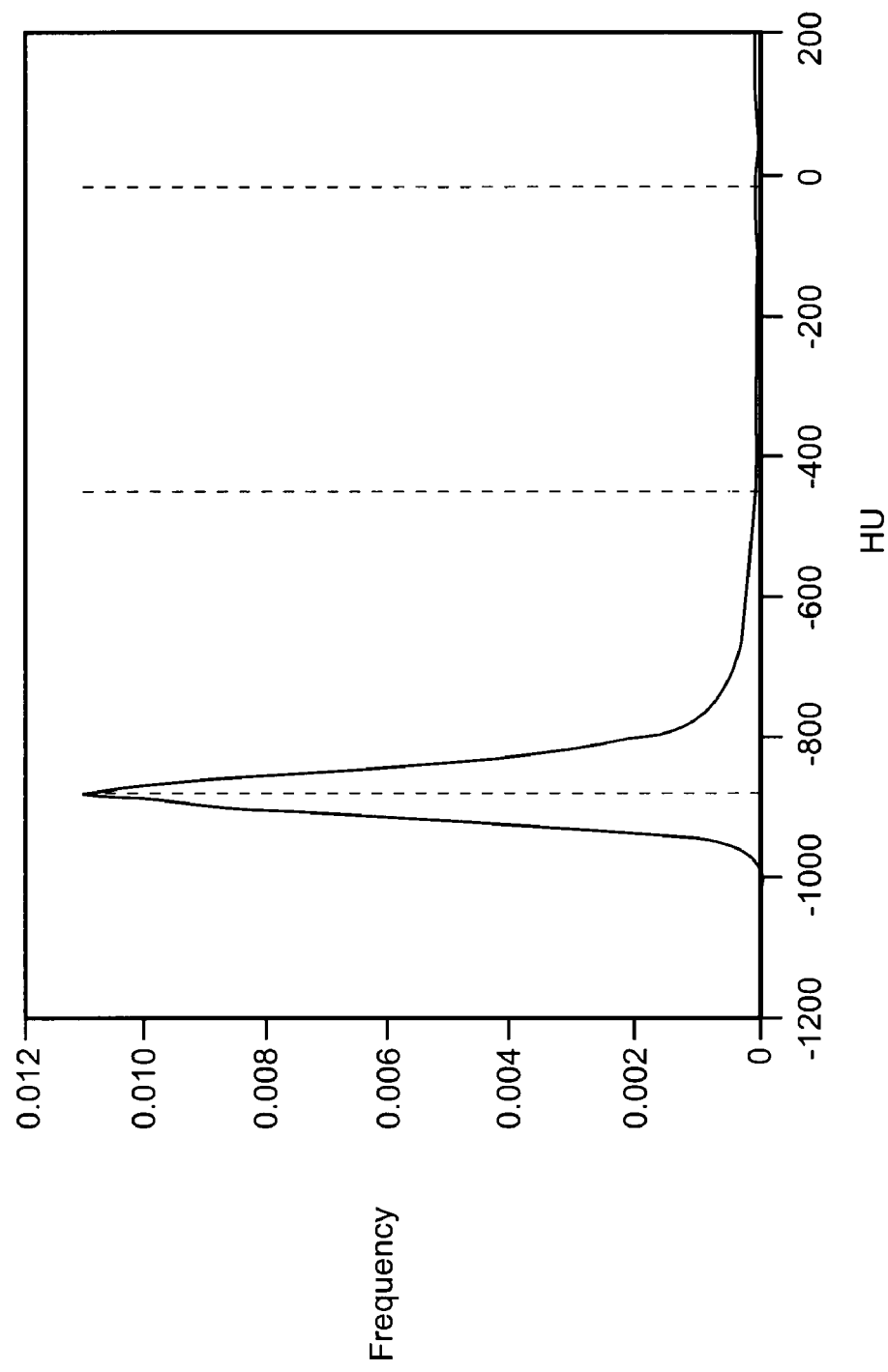
FIG. 22 is a histogram of a real 5 mm nodule between −1200 HU and 200 HU.
Figure 23:
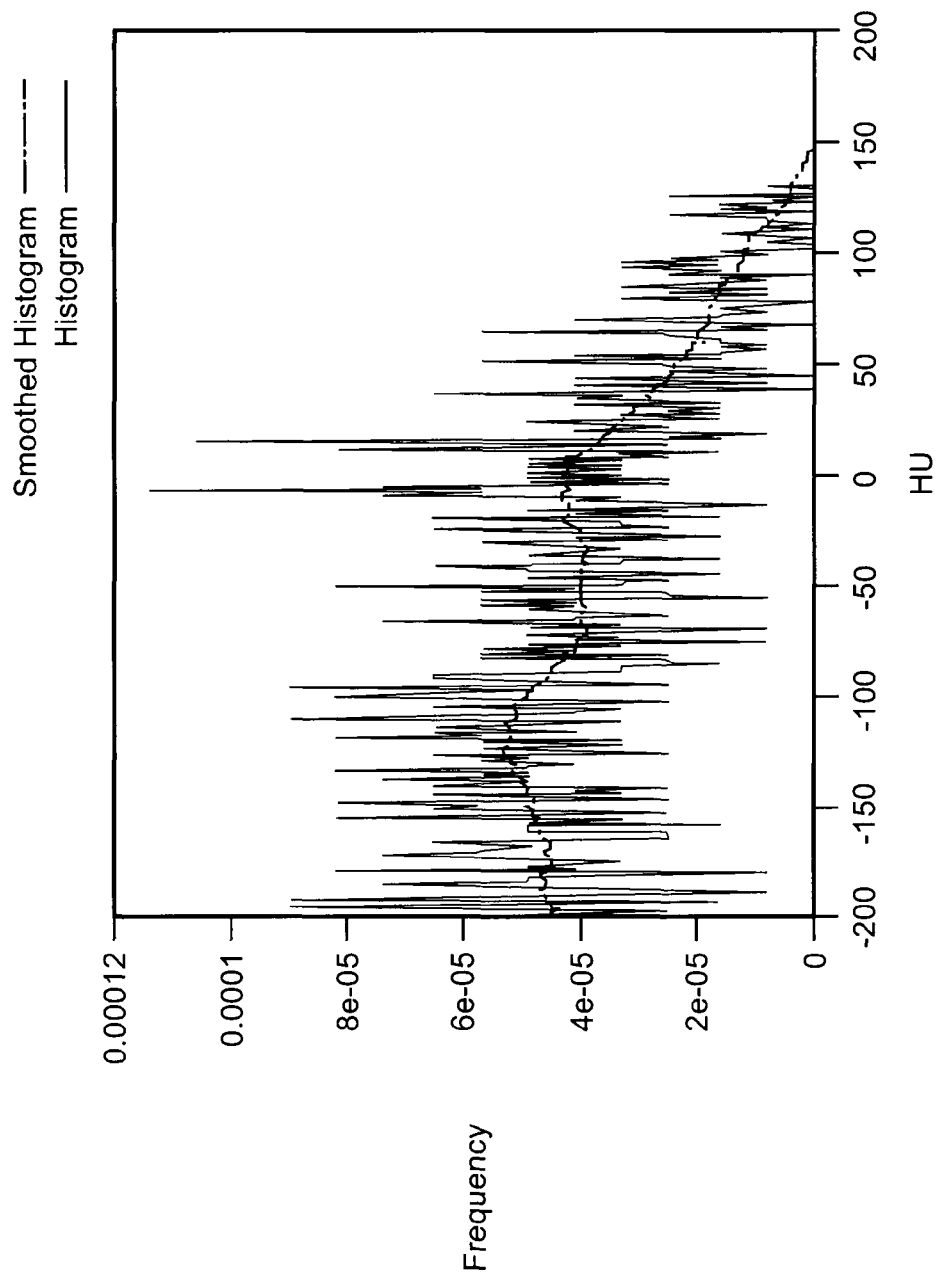
FIG. 23 is a histogram of a real 5 mm nodule between −200 HU and 200 HU.

For small nodules less than 5 mm in size, the solid-tissue distribution in the histogram is usually obscured by partial voxels from small vessels and noise voxels. In this case, the solid-tissue peak value cannot be found through the histogram. The adaptive thresholding algorithm is modified such that the mean solid-tissue value is fixed at the model value of −27 HU. The adaptive threshold is then calculated as the midpoint between the peak parenchyma value and −27 HU. A histogram of a 5 mm nodule appears in FIG. 22. The mean solid-tissue value cannot be found because there is no prominent peak on the right side of the histogram.

After the adaptive threshold is determined, the ROI is then resampled into 0.25 mm isoptropic space using trilinear interpolation.

The second ROI is registered to the first ROI using a rigid-body transformation. The rigid-body transformation is a function of six parameters: $(t_x, t_y, t_z, r_x, r_y, r_z)$, or translation in x, translation in y, translation in z, rotation about the x-axis, rotation about the y-axis, and rotation about the z-axis, respectively. The rigid-body transformation is a mapping of a point v in 3-d space to a point v' in transformed space defined by the following equation:

$$v' = R_x R_y R_z v + \begin{bmatrix} t_x \\ t_y \\ t_z \end{bmatrix} \quad (1)$$

where $R_x$, $R_y$, and $R_z$ are the rotation matrices defined as:

$$R_x = \begin{bmatrix} 1 & 0 & 0 \\ 0 & \cos(r_x) & -\sin(r_x) \\ 0 & \sin(r_x) & \cos(r_x) \end{bmatrix} \quad (2)$$

$$R_y = \begin{bmatrix} \cos(r_y) & 0 & \sin(r_y) \\ 0 & 1 & 0 \\ -\sin(r_y) & 0 & \cos(r_y) \end{bmatrix} \quad (3)$$

-continued $$R_z = \begin{bmatrix} \cos(r_z) & -\sin(r_z) & 0 \\ \sin(r_z) & \cos(r_z) & 0 \\ 0 & 0 & 1 \end{bmatrix}. \quad (4)$$

The second ROI is registered to the first ROI by conducting a search over the 6 transformation parameters: The search is designed to minimize a similarity metric between the transformed second ROI and the first ROI, thus aligning the two ROI's using the transformation parameters. The mean-squared-difference (MSD) is used as the similarity metric and is defined as $$MSD = \frac{1}{N} \sum_{i,j,k} \sum \sum (ROI_{2t}(i,j,k) - ROI_1(i,j,k))^2 \quad (5)$$

where N is the number of pixels in $ROI_1$. With the MSD metric, perfectly registered images will produce a metric of zero. The goal of registration is to align the nodule in the first ROI with the nodule in the second ROI. The MSD metric can be modified by weighting it with an appropriately sized gaussian. The gaussian is positioned over the center of the nodule and has a standard deviation equal to the radius of the nodule. The gaussian-weighted MSD is defined as:

$$MSD = \frac{1}{N} \sum_{i,j,k} \sum \sum \exp\left(\frac{(g_x - i)^2 + (g_y - j)^2 + (g_z - k)^2)}{2g_r^2}\right) \quad (6)$$
$$(ROI_{2t}(i,j,k) - ROI(i,j,k))^2$$

where $(g_x, g_y, g_z)$ is the center of the gaussian and $g_r$ is the standard deviation of the gaussian. Using the gaussian-weighted MSD will force the registration algorithm to focus more on aligning the nodule than any periphery structures (e.g. vessels or pleural wall). However, some of the periphery structures are needed for a good registration, thus the size of the gaussian is selected to include all of the nodule and some of its periphery.

The similarity metric is minimized using Powell's method, a multi-dimensional direction-set search algorithm. W. Press, editor. *Numerical Recipes in C*. Cambridge University Press, second edition, 1992. The initial translation parameter is set to the offset of the center of the first nodule to the center of the second nodule. The initial rotation parameters are set to (0,0, 0). The search is terminated when either all the transformation parameters change within some epsilon, or the similarity metric does not change by more than a tolerance value. After the registration is complete, the second ROI will be the same size as the first ROI.

Figure 24:
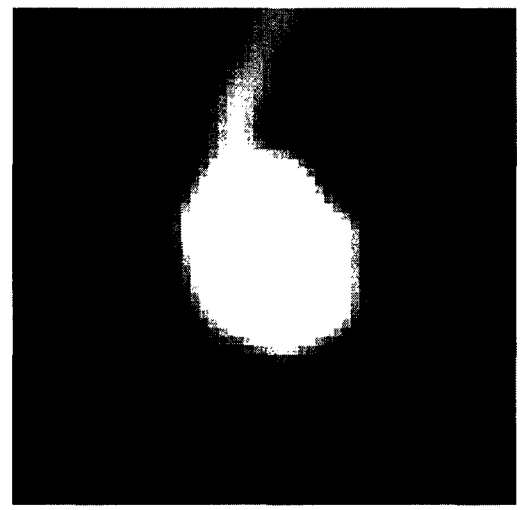
FIG. 24 illustrates an image of the rigid-body registration of the first ROI.
Figure 25:
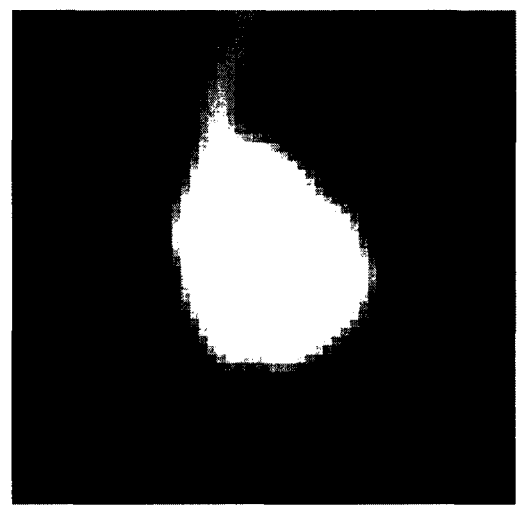
FIG. 25 illustrates an image of the rigid-body registration of the second ROI.
Figure 26:
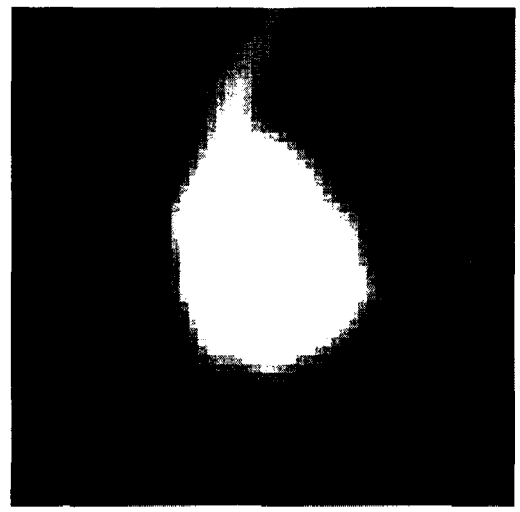
FIG. 26 illustrates an image of the rigid-body registration of the second ROI registered to the first ROI.
Figure 27:
FIG. 27 illustrates the difference image between the first ROI and the second ROI.
Figure 28:
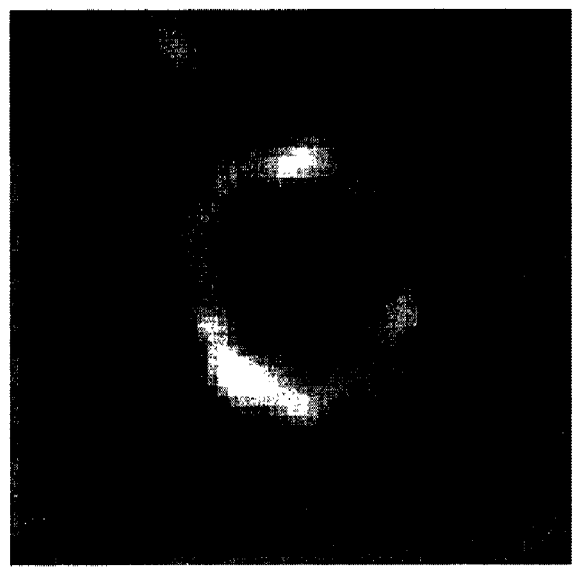
FIG. 28 illustrates the difference image between the first ROI and the registered second ROI.

An example of rigid-body registration on two nodules is shown in FIG. 26. The first ROI and the second ROI are shown in FIGS. 24 and 25, respectively. The registration algorithm aligned the second ROI with the first ROI using translation parameters of (−13.40, 16.61, −0.88) pixels and rotation parameters of (0.79, −3.52, −7.20) degrees. The resulting registered image is seen in FIG. 26. FIG. 27 shows the difference image between the first ROI and the second ROI. The difference image shows that the vessels at the top of the image and on the right of the image are not aligned properly. The circular white ring is the growth of the nodule between the two scan times. FIG. 28 shows the difference image between the first ROI and the registered second ROI. The vessels are less visible in the second difference image than in the first difference image, meaning that with the registered image the vessels and nodule are aligned better than without registration.

A binary image of the solid nodule is created by thresholding the image with the adaptive threshold determined previously. Any attached vessels are removed by using iterative morphological filtering. A morphological opening, followed by masking with the original binary image, is performed using a decreasing sphere size. The initial diameter of the sphere is ¾ of the nodule radius, resulting in the removal of all vessels that are smaller than ¾ of the radius.

If the nodule is juxtapleural, then the pleural surface is segmented from the nodule using a clipping plane approach. Starting at a point inside the nodule, a clipping plane is moved towards the pleural wall. When the relative change in the size of the nodule is over a threshold, the plane is reorientated to minimize the size of the nodule. Finally, the algorithm stops when the reorientation procedure does not produce any significant change in the size of the nodule. The juxtapleural nodule is then segmented by using the clipping plane from the previous iteration.

Figure 29:
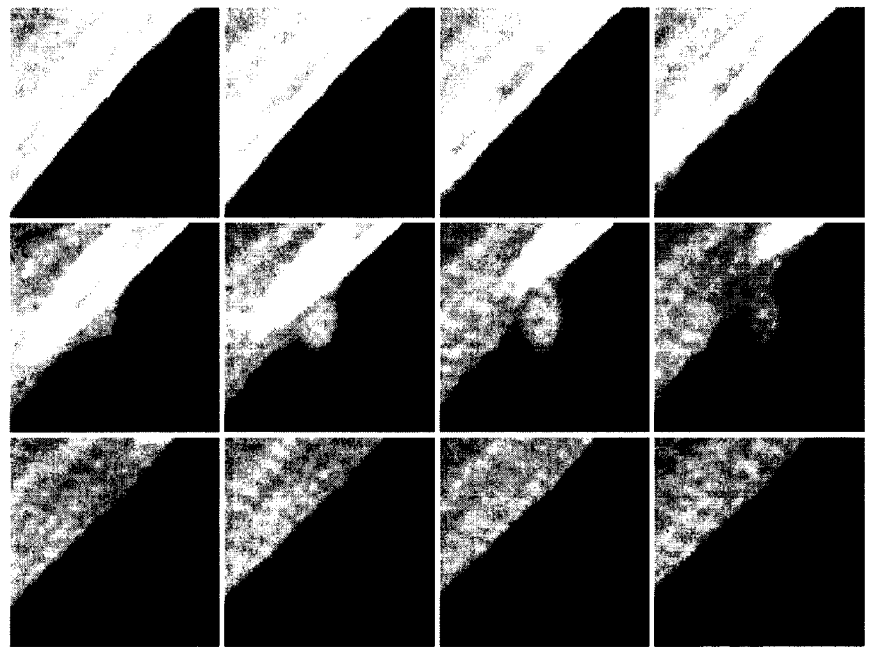
FIG. 29 illustrates a montage of the original gray scale image showing the nodule region-of-interest.
Figure 30:
FIG. 30 illustrates a montage showing the segmented nodule corresponding to FIG. 31.

FIG. 29 shows an example of the solid nodule segmentation. A montage of the original gray-scale nodule is shown on in FIG. 29, while the segmented nodule is shown in FIG. 30. The segmented nodule is shaded in red. The pleural surface and vessels are shaded in green, while the background is shaded in gray. The solid nodule segmentation has detached the vessel and pleural wall from the nodule.

Given the two segmented nodules, it is possible to adjust the nodule segmentations by comparing the segmented nodules and the thresholded regions. Let $S_1$ be the segmented nodule from the first image and $T_1$ be the thresholded first image before vessel or pleural surface removal. Likewise, let $S_2$ be the segmented nodule from the second image and $T_2$ be the thresholded second image.

A rule-based system is used to mark active pixels in the segmented nodule $S_1$ as repeat nodule, nodule atrophy, or nodule missegmentation. If an active pixel in the first segmented nodule corresponds to an active pixel in the second segmented nodule, then that pixel is a repeat nodule pixel because it is present in both segmented nodules. If an active pixel in the first segmented nodule corresponds to an inactive pixel in the second segmented nodule and an inactive pixel in the second thresholded image, then that pixel is a nodule atrophy pixel because it is present in the first nodule, but not present in the second image. Finally, if an active pixel in the first segmented nodule corresponds to an inactive pixel in the second segmented nodule and an active pixel in the second thresholded region, then that pixel is a missegmented nodule pixel because it is a non-nodule object (vessel or pleural wall) in the second region.

An active pixel in the segmented nodule $S_2$ can be marked as repeat nodule pixel, nodule growth pixel, or nodule missegmented pixel by using a similar set of rules. A summary of the rules for marking a region in $S_1$ or $S_2$ are given below.

For a foreground pixel in the first segmented nodule, $S_1$:
 (A) If the corresponding pixel in $S_2$ and the corresponding pixel in $T_2$ are both foreground, then the pixel in $S_1$ is a repeated nodule pixel from the first region-of-interest ($ROI_1$) to the transformed second region-of-interest ($ROI_{2t}$).

(B) If the corresponding pixel in $S_2$ is background and the corresponding pixel in $T_2$ is background, then the pixel in $S_1$ is nodule atrophy pixel.

(C) If the corresponding pixel in $S_2$ is background and the corresponding pixel in $T_2$ is foreground, then the pixel in $S_1$ is a missegmented pixel in the first region-of-interest ($ROI_1$).

For a foreground pixel in the second segmented nodule, $S_2$:

(D) If the corresponding pixel in $S_1$ and the corresponding pixel in $T_1$ are both foreground, then the pixel in $S_2$ is a repeated nodule pixel from the first region-of-interest ($ROI_1$) to the transformed second region-of-interest ($ROI_{2t}$).

(E) If the corresponding pixel in $S_1$ is background and the corresponding pixel in $T_1$ is background, then the pixel in $S_2$ is nodule growth pixel.

(F) If the corresponding pixel in $S_1$ is background and the corresponding pixel in $T_1$ is foreground, then the pixel in $S_2$ is a missegmented pixel in the transformed second region-of-interest ($ROI_{2t}$).

Figure 31:
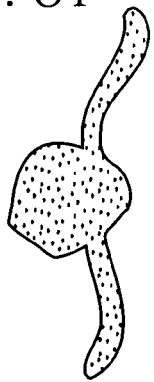
FIG. 31 illustrates a first thresholded image ($T_1$) corresponding to the first region-of-interest ($ROI_1$)
Figure 32:
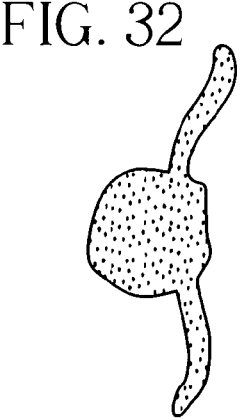
FIG. 32 illustrates a second thresholded image ($T_2$) corresponding to the transformed second region-of-interest ($ROI_{2t}$)
Figure 33:
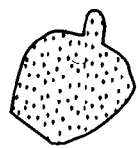
FIG. 33 illustrates a first segmented nodule ($S_1$) corresponding to the first region-of-interest ($ROI_1$)
Figure 34:
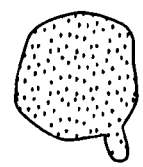
FIG. 34 illustrates a second segmented nodule ($S_2$) corresponding to the transformed second region-of-interest ($ROI_{2t}$)
Figure 35:
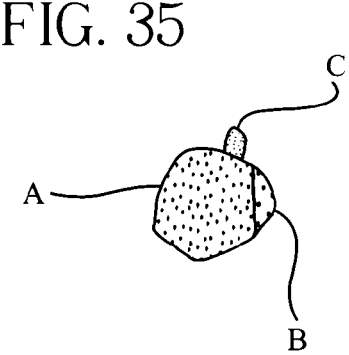
FIG. 35 illustrates the first segmented nodule ($S_1$) having the active pixels therein marked as (A) nodule in time 1, (B) nodule atrophy, or (C) missegmentation.
Figure 36:
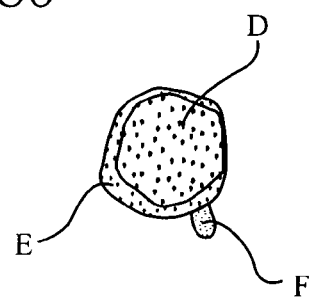
FIG. 36 illustrates a second segmented nodule ($S_2$) having the active pixels therein marked as (D) nodule in time 2, (E) nodule growth, or (F) missegmentation.
Figure 37:
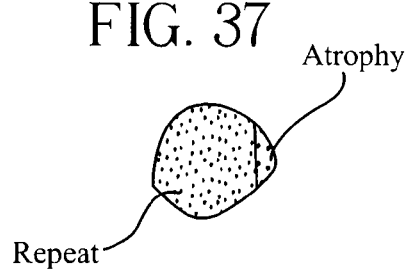
FIG. 37 illustrates a first adjusted segmented nodule ($N_1$) corresponding to the first region-of-interest ($ROI_1$)
Figure 38:
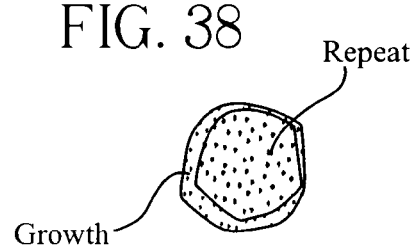
FIG. 38 illustrates a second adjusted segmented nodule ($N_2$) corresponding to the transformed second region-of-interest ($ROI_{2t}$).

FIGS. 31 through 38 illustrate an example of the segmentation adjustment on a registered vascularized nodule. The thresholded nodule at two different times is shown in FIGS. 31 and 32, and the segmented nodules are shown in FIGS. 33 and 34. In the first segmentation part of the top attached vessel has been missegmented as part of the nodule, and in the second segmentation, part of the bottom attached vessel has been missegmented as part of the second nodule. By using the rules described above, the regions of each segmentation are marked in FIGS. 35 and 36 as (A) nodule in time 1, (B) nodule atrophy, (C) nodule missegmentation in time 1, (D) nodule in time 2, (E) nodule growth, or (F) nodule missegmentation in time 2. Finally, the segmentations of both nodules are adjusted in FIGS. 37 and 38 by removing the missegmented regions (C) and (F). The volumes of the nodules in the adjusted segmentations are more accurate than the volumes in the original segmentations because the vessel attachments have been removed. This leads to a more accurate determination of doubling time or percent volume change. Furthermore, regions of growth and atrophy of the nodule can be examined over time.

Thus, while there have been described what are presently believed to be the preferred embodiments of the invention, those skilled in the art will realize that changes and modifications may be made thereto without departing from the spirit of the invention, and is intended to claim all such changes and modifications as fall within the true scope of the invention.

What is claimed is:

1. A method for analyzing a computed tomography scan of a whole lung for lung nodules, said method comprising the steps of:
   (a) segmenting a first lung region and a second lung region from the computed tomography scan, the first lung region corresponding to lung parenchyma of the lung and the second lung region corresponding to at least one of a pleural surface of the lung and a surface defined by vessels within the lung;
   (b) generating an initial list of nodule candidates from the computed tomography scan within the first lung region, the list including at least a center location and an estimated size associated with each nodule candidate;
   (c) generating a subimage for each nodule candidate in the initial list;
   (d) selectively removing streaking artifacts from the sub-image; and
   (e) filtering the nodule candidate identified on the initial list to eliminate false positives from the list.

2. A method for analyzing a whole lung computed tomography scan as defined in claim 1, wherein step (b) comprises the substeps of:
   (i) thresholding the first lung region;
   (ii) labeling high density foreground voxels to identify nodule candidate regions;
   (iii) determining for each foreground voxel RMI;
   (iv) selecting the local maximum $\hat{R}_{MI}$ within a nodule candidate region;
   (v) determining a limited extent criterion for each foreground voxel which corresponds to a $\hat{R}_{MI}$;
   (vi) generating the initial list of nodule candidates which satisfy the limited extent criterion, the list including at least Nc and $\hat{R}_{MI}$ associated with the corresponding foreground voxel.

3. A method for analyzing a whole lung computed tomography scan as defined in claim 1, wherein step (d) comprises the substeps of:
   (i) determining an amount of streaking artifact present in the sub-image; and
   (ii) filtering the streaking artifact out from the subimage when the amount of the streaking artifact present in the sub-image exceeds $T_{sar}$.

4. A method for analyzing a whole lung computed tomography scan as defined in claim 3, wherein the amount of streaking artifact present in the sub-image is calculated by a metric $$S_m = \frac{1}{nmp} \sum_i^n \sum_j^m \sum_k^p ((I(i,j,k) - I(i, j+1, k))^2$$

the metric $S_m$ is defined with respect to a global coordinate system as follows: where i, j, and k are indices for X, Y and Z coordinates respectively and n, m and p are the dimensions of the sub-image in X, Y and Z directions respectively.

5. A method for analyzing a whole lung computed tomography scan as defined in claim 3, wherein the filtering is performed by a vertical median filter of size 1×3.

6. A method for analyzing a whole lung computed tomography scan as defined in claim 3, wherein $T_{sar}$ is from about 20000 to about 80000.

7. A method for analyzing a whole lung computed tomography scan as defined in claim 1, wherein step (e) comprises the substeps of:
   determining for each nodule candidate a fraction, $F_a$, a surface of the nodule candidate that is attached to other solid structures; and
   (ii) removing the nodule candidate from the list when the fraction exceeds $T_a$.

8. A method for analyzing a whole lung computed tomography scan as defined in claim 1, wherein step (e) comprises the substeps of:
   (i) generating a cube wall about each nodule candidate;
   (ii) determining an intersection volume, $V_{ni}$, corresponding to portions of the nodule region associated with the nodule candidate that intersect the cube wall;
   (ii) removing the nodule candidate from the list when the fraction of the intersection volume, $V_{ni}$, over the volume of the nodule candidate, $V_n$, exceeds $T_{vv}$.

9. A method for analyzing a whole lung computed tomography scan as defined in claim 7, wherein step (e) comprises the substeps of:
  (i) generating a cube wall about each nodule candidate;
  (ii) determining an intersection volume, $V_{ni}$, corresponding to portions of the nodule region associated with the nodule candidate that intersect the cube wall;
  (ii) removing the nodule candidate from the list when the fraction of the intersection volume, $V_{ni}$, over the volume of the nodule candidate, $V_n$, exceeds $T_{vv}$.

10. A lung nodule detecting apparatus for analyzing a computed tomography scan of a whole lung for lung nodules, the lung nodule detecting apparatus comprising:
  a detecting unit configured to:
  (a) segment a first lung region and a second lung region from the computed tomography scan, the first lung region corresponding to lung parenchyma of the lung and the second lung region corresponding to at least one of a pleural surface of the lung and a surface defined by vessels within the lung;
  (b) generate an initial list of nodule candidates from the computed tomography scan within the first lung region, the list including at least a center location and an estimated size associated with each nodule candidate;
  (c) generate a subimage for each nodule candidate in the initial list;
  (d) selectively remove streaking artifacts from the subimage; and
  (e) filter the nodule candidate identified on the initial list to eliminate false positives from the list.

11. A lung nodule detecting apparatus as defined by claim 10, wherein for step (b) said detecting unit is configured to:
  (i) threshold the first lung region;
  (ii) label high density foreground voxels to identify nodule candidate regions;
  (iii) determine for each foreground voxel RMI;
  (iv) select the local maximum $\hat{R}_{MI}$ within a nodule candidate region;
  (v) determine a limited extent criterion for each foreground voxel which corresponds to a $\hat{R}_{MI}$;
  (vi) generate the initial list of nodule candidates which satisfy the limited extent criterion, the list including at least $N_c$ and $\hat{R}_{MI}$ associated with the corresponding foreground voxel.

12. A lung nodule detecting apparatus as defined by claim 10, wherein step (d) comprises the substeps of:
  (i) determine an amount of streaking artifact present in the sub-image; and
  (ii) filter the streaking artifact out from the subimage when the amount of the streaking artifact present in the sub-image exceeds $T_{sar}$.

13. A lung nodule detecting apparatus as defined by claim 12, wherein the amount of streaking artifact present in the sub-image is calculated by a metric $$S_m = \frac{1}{nmp}\sum_i^n \sum_j^m \sum_k^p ((I(i,j,k) - I(i,j+1,k))^2$$

the metric $S_m$ is defined with respect to a global coordinate system as follows: where i, j, and k are indices for X, Y and Z coordinates respectively and n, m and p are the dimensions of the sub-image in X, Y and Z directions respectively.

14. A lung nodule detecting apparatus as defined by claim 12, further comprising a vertical median filter of size 1×3 to filter the streaking artifact.

15. A lung nodule detecting apparatus as defined by claim 12, wherein $T_{sar}$ is from about 20000 to about 80000.

16. A lung nodule detecting apparatus as defined by claim 10, wherein step (e) comprises the substeps of:
  (i) determining for each nodule candidate a fraction, Fa, a surface of the nodule candidate that is attached to other solid structures; and
  (ii) removing the nodule candidate from the list when the fraction exceeds Ta.

17. A lung nodule detecting apparatus as defined by claim 10, wherein step (e) comprises the substeps of:
  (i) generating a cube wall about each nodule candidate;
  (ii) determining an intersection volume, $V_{ni}$, corresponding to portions of the nodule region associated with the nodule candidate that intersect the cube wall;
  (ii) removing the nodule candidate from the list when the fraction of the intersection volume, $V_{ni}$, over the volume of the nodule candidate, $V_n$, exceeds $T_{vv}$.

18. A lung nodule detecting apparatus as defined by claim 16, wherein step (e) comprises the substeps of:
  (i) generating a cube wall about each nodule candidate;
  (ii) determining an intersection volume, $V_{ni}$, corresponding to portions of the nodule region associated with the nodule candidate that intersect the cube wall;
  (ii) removing the nodule candidate from the list when the fraction of the intersection volume, $V_{ni}$, over the volume of the nodule candidate, $V_n$, exceeds $T_{vv}$.

19. An article of manufacture for detecting lung nodules in a computed tomography scan of a whole lung, the article comprising:
  a machine readable medium containing one or more programs which when executed implement the steps of:
  (a) segmenting a first lung region and a second lung region from the computed tomography scan, the first lung region corresponding to lung parenchyma of the lung and the second lung region corresponding to at least one of a pleural surface of the lung and a surface defined by vessels within the lung;
  (b) generating an initial list of nodule candidates from the computed tomography scan within the first lung region, the list including at least a center location and an estimated size associated with each nodule candidate;
  (c) generating a subimage for each nodule candidate in the initial list;
  (d) selectively removing streaking artifacts from the sub-image; and
  (e) filtering the nodule candidate identified on the initial list to eliminate false positives from the list.

20. An article of manufacture for detecting lung nodules as defined by claim 19, wherein step (b) comprises the substeps of:
  (i) thresholding the first lung region;
  (ii) labeling high density foreground voxels to identify nodule candidate regions;
  (iii) determining for each foreground voxel RMI;
  (iv) selecting the local maximum $\hat{R}_{MI}$ within a nodule candidate region;
  (v) determining a limited extent criterion for each foreground voxel which corresponds to a $\hat{R}_{MI}$;
  (vi) generating the initial list of nodule candidates which satisfy the limited extent criterion, the list including at least $N_c$ and $\hat{R}_{MI}$ associated with the corresponding foreground voxel.

21. An article of manufacture for detecting lung nodules as defined by claim 19, wherein step (d) comprises the substeps of:
(i) determining an amount of streaking artifact present in the sub-image; and
(ii) filtering the streaking artifact out from the subimage when the amount of the streaking artifact present in the sub-image exceeds $T_{sar}$.

22. An article of manufacture for detecting lung nodules as defined by claim 21, wherein the amount of streaking artifact present in the sub-image is calculated by a metric $$S_m = \frac{1}{nmp}\sum_i^n \sum_j^m \sum_k^p ((I(i,j,k) - I(i,j+1,k))^2$$

the metric $S_m$ is defined with respect to a global coordinate system as follows: where i, j, and k are indices for X, Y and Z coordinates respectively and n, m and p are the dimensions of the sub-image in X, Y and Z directions respectively.

23. An article of manufacture for detecting lung nodules as defined by claim 21, wherein the filtering is performed by a vertical median filter of size 1×3.

24. An article of manufacture for detecting lung nodules as defined by claim 21, wherein $T_{sar}$ is from about 20000 to about 80000.

25. An article of manufacture for detecting lung nodules as defined by claim 19, wherein step (e) comprises the substeps of:
(i) determining for each nodule candidate a fraction, $F_a$, a surface of the nodule candidate that is attached to other solid structures; and
(ii) removing the nodule candidate from the list when the fraction exceeds $T_a$.

26. An article of manufacture for detecting lung nodules as defined by claim 19, wherein step (e) comprises the substeps of:
(i) generating a cube wall about each nodule candidate;
(ii) determining an intersection volume, $V_{ni}$, corresponding to portions of the nodule region associated with the nodule candidate that intersect the cube wall;
(ii) removing the nodule candidate from the list when the fraction of the intersection volume, $V_{ni}$, over the volume of the nodule candidate, Vn, exceeds $T_{vv}$.

27. An article of manufacture for detecting lung nodules as defined by claim 25, wherein step (e) comprises the substeps of:
(i) generating a cube wall about each nodule candidate;
(ii) determining an intersection volume, $V_{ni}$, corresponding to portions of the nodule region associated with the nodule candidate that intersect the cube wall;
(ii) removing the nodule candidate from the list when the fraction of the intersection volume, $V_{ni}$, over the volume of the nodule candidate, $V_n$, exceeds $T_{vv}$.

* * * * *

UNITED STATES PATENT AND TRADEMARK OFFICE
CERTIFICATE OF CORRECTION

| | | |
|---|---|---|
| PATENT NO. | : 7,751,607 B2 | Page 1 of 2 |
| APPLICATION NO. | : 12/277877 | |
| DATED | : July 6, 2010 | |
| INVENTOR(S) | : Reeves et al. | |

It is certified that error appears in the above-identified patent and that said Letters Patent is hereby corrected as shown below:

Claim 7, Column 24, Line 52

Now reads    "determining for each"

Should read    -- (i) determining for each --

Claim 8, Column 24, Line 64

Now reads:    "(ii) removing the nodule candidate"

Should read:    -- (iii) removing the nodule candidate --

Claim 9, Column 25, Line 8

Now reads:    "(ii) removing the nodule candidate"

Should read:    -- (iii) removing the nodule candidate --

Claim 17, Column 26, Line 19

Now reads:    "(ii) removing the nodule candidate"

Should read:    -- (iii) removing the nodule candidate --

Claim 18, Column 26, Line 28

Now reads:    "(ii) removing the nodule candidate"

Should read:    -- (iii) removing the nodule candidate --

Signed and Sealed this
Eighteenth Day of January, 2011

David J. Kappos
*Director of the United States Patent and Trademark Office*

CERTIFICATE OF CORRECTION (continued)
U.S. Pat. No. 7,751,607 B2

Claim 26, Column 28, Line 16

Now reads:    "(ii) removing the nodule candidate"

Should read:    -- (iii) removing the nodule candidate --

Claim 27, Column 28, Line 26

Now reads:    "(ii) removing the nodule candidate"

Should read:    -- (iii) removing the nodule candidate --